United States Patent
Ozawa et al.

(10) Patent No.: US 8,373,728 B2
(45) Date of Patent: Feb. 12, 2013

(54) BY-REGION DISPLAY IMAGE QUALITY CONTROLLING DEVICE, SELF-LUMINOUS DISPLAY DEVICE, AND COMPUTER PROGRAM

(75) Inventors: Atsushi Ozawa, Kanagawa (JP); Mitsuru Tada, Kanagawa (JP)

(73) Assignee: Sony Corporation, Tokyo (JP)

(*) Notice: Subject to any disclaimer, the term of this patent is extended or adjusted under 35 U.S.C. 154(b) by 884 days.

(21) Appl. No.: 12/223,177

(22) PCT Filed: Apr. 25, 2007

(86) PCT No.: PCT/JP2007/058956
§ 371 (c)(1),
(2), (4) Date: Jul. 24, 2008

(87) PCT Pub. No.: WO2007/125960
PCT Pub. Date: Nov. 8, 2007

(65) Prior Publication Data
US 2010/0182332 A1    Jul. 22, 2010

(30) Foreign Application Priority Data

Apr. 27, 2006  (JP) .................................. 2006-124033
Mar. 27, 2007  (JP) .................................. 2007-083081

(51) Int. Cl.
*G09G 5/10*    (2006.01)
(52) U.S. Cl. ......... 345/690; 345/581; 345/589; 345/1.3; 345/63; 345/77
(58) Field of Classification Search .................... None
See application file for complete search history.

(56) References Cited

U.S. PATENT DOCUMENTS

| | | | | |
|---|---|---|---|---|
| 5,936,608 A | * | 8/1999 | Springer | 345/690 |
| 6,160,532 A | * | 12/2000 | Kaburagi et al. | 345/87 |
| 2002/0113796 A1 | * | 8/2002 | Oshiyama et al. | 345/581 |

FOREIGN PATENT DOCUMENTS

| | | |
|---|---|---|
| JP | 06-095834 A | 4/1994 |
| JP | 07-274190 | 10/1995 |
| JP | 08-320679 | 12/1996 |
| JP | 2000-242255 | 9/2000 |
| JP | 2001-117693 A | 4/2001 |
| JP | 2001-175239 | 6/2001 |
| JP | 2004-070103 | 3/2004 |

OTHER PUBLICATIONS

International Search Report; International Application No. PCT/JP2007/058956; Jul. 3, 2007.
Japanese Office Action issued Dec. 27, 2011 for corresponding Japanese Application No. 2007-083081.

* cited by examiner

*Primary Examiner* — Antonio A Caschera
(74) *Attorney, Agent, or Firm* — Radar, Fishman & Grauer PLLC

(57) ABSTRACT

When an arbitrary position and an arbitrary size on a display screen are specified as an emphasized display region so as to be interlocked with a display content of an application program, only for another region part excluding the emphasized display region, power consumed by the region part is aggressively reduced and simultaneously image quality is aggressively lowered as compared with the emphasized display region. Thereby, visibility and reduction in power consumption can be surely made compatible with each other.

6 Claims, 31 Drawing Sheets

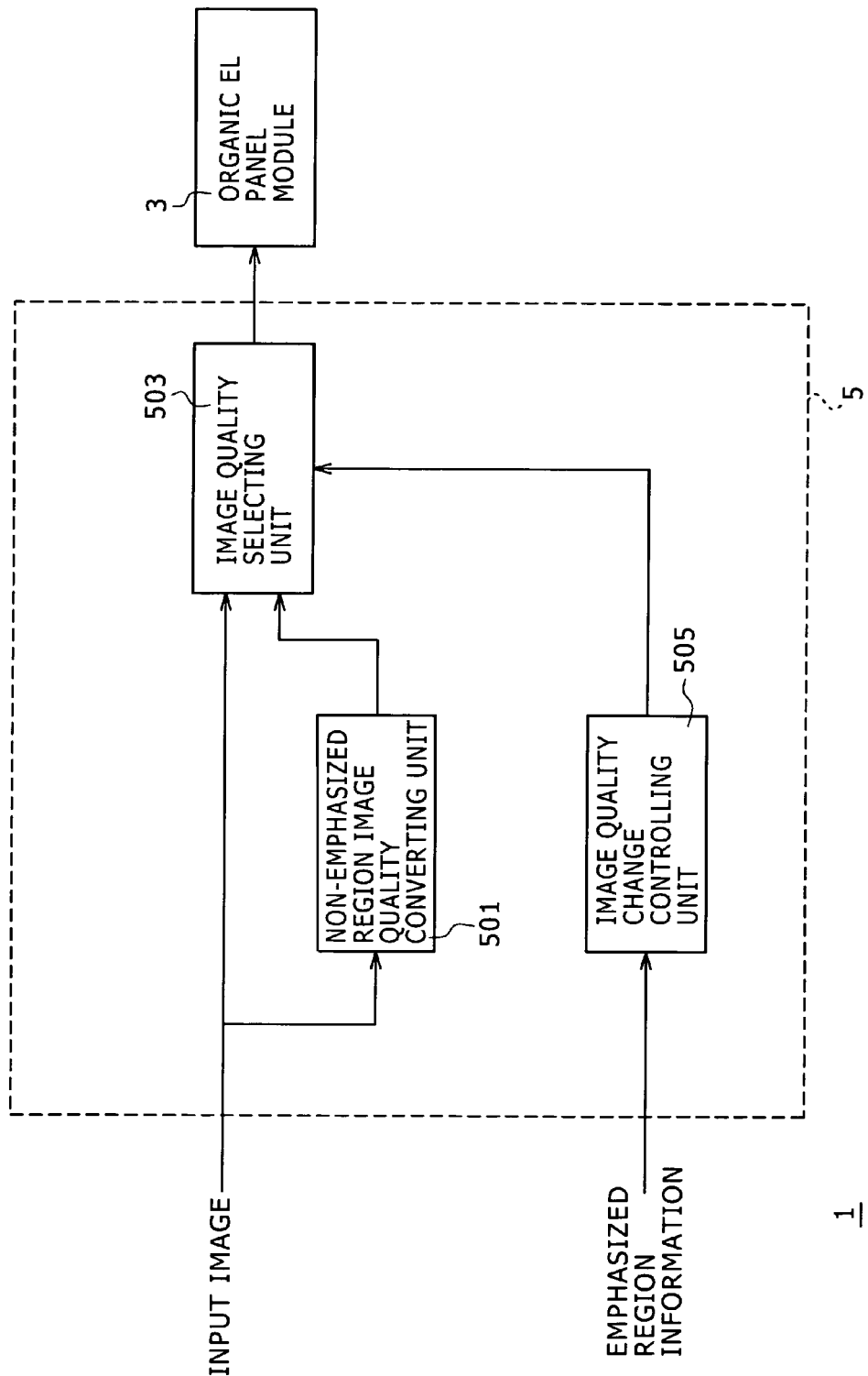

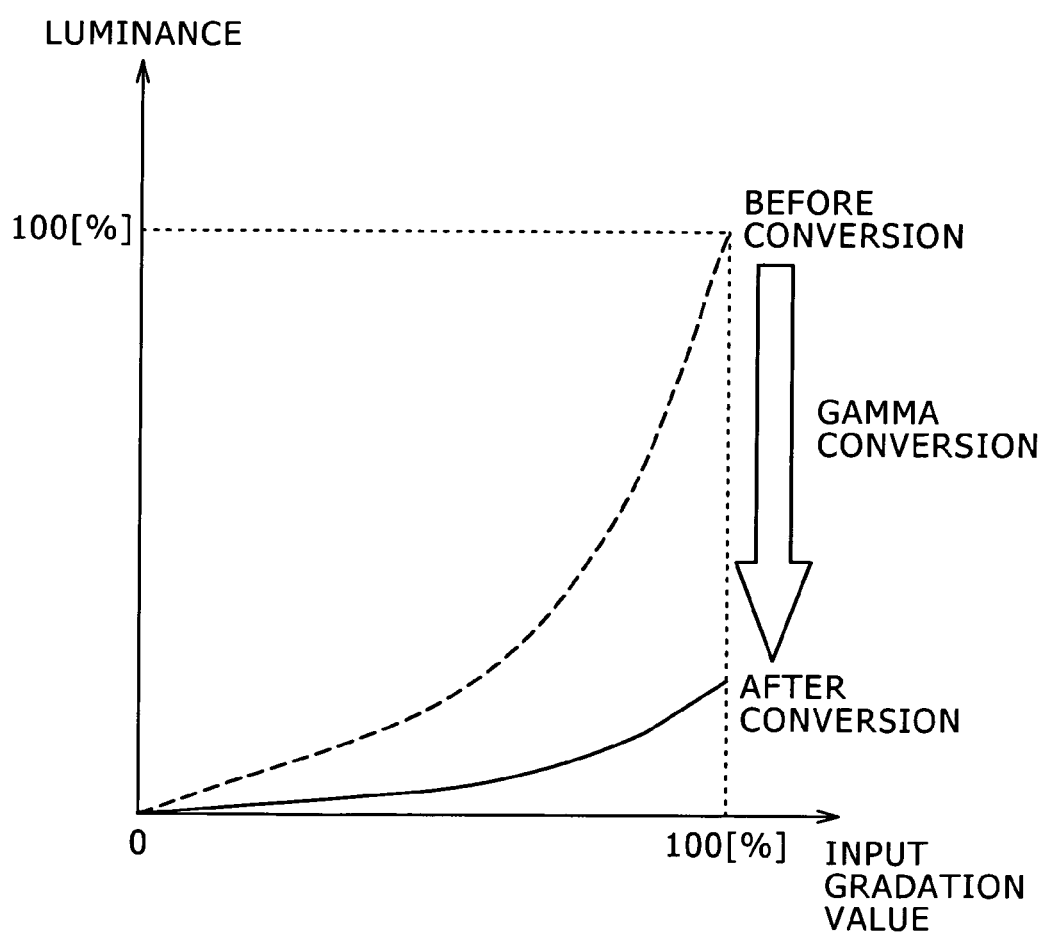

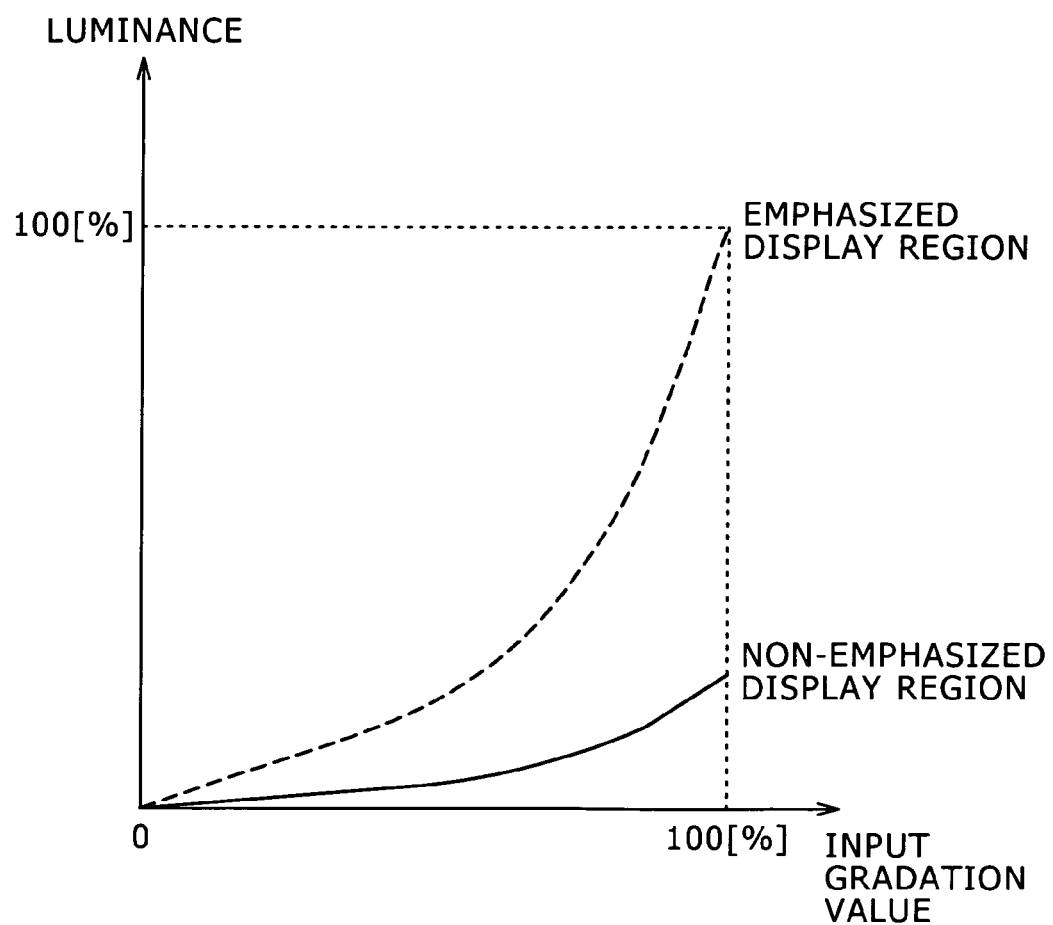

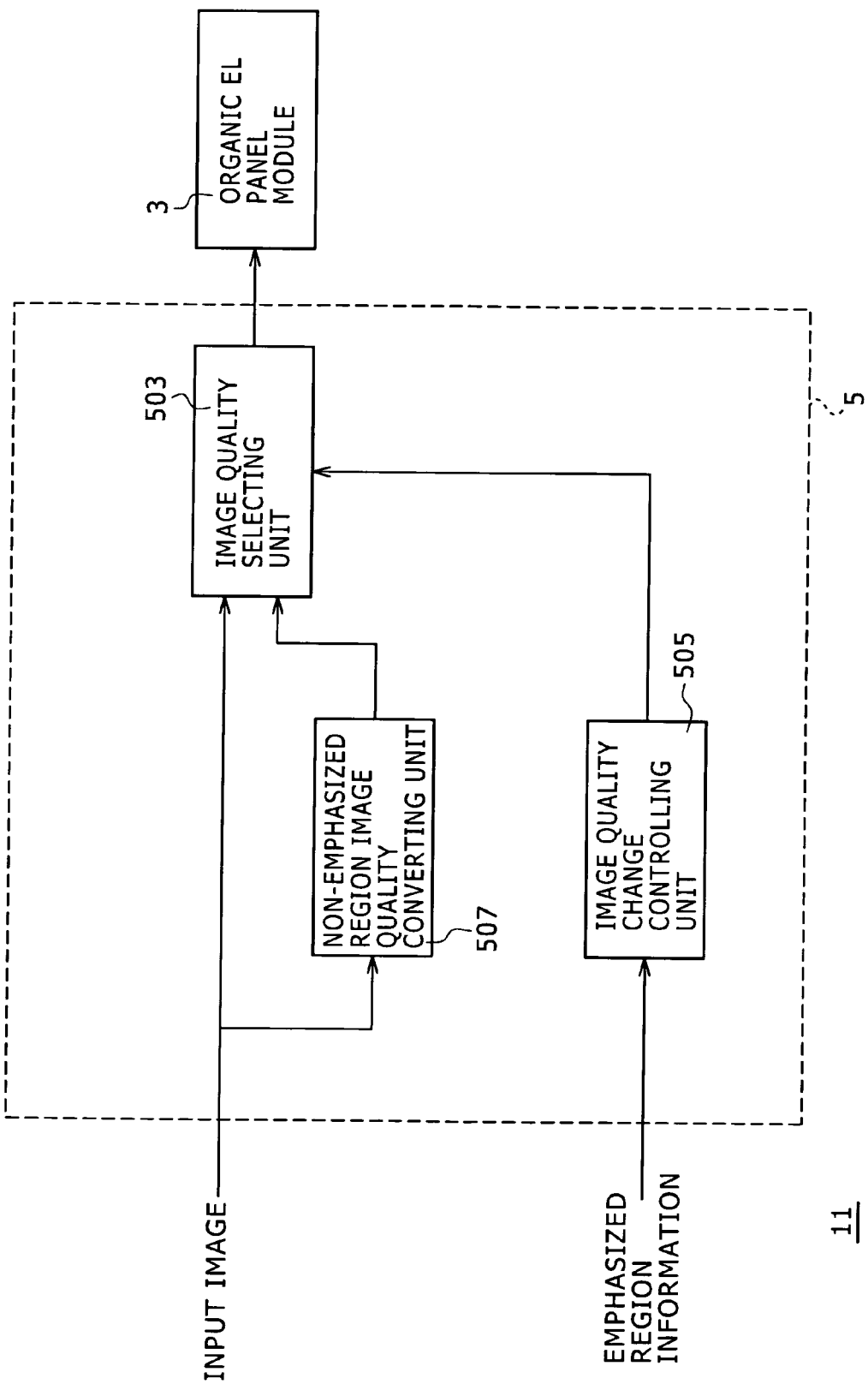

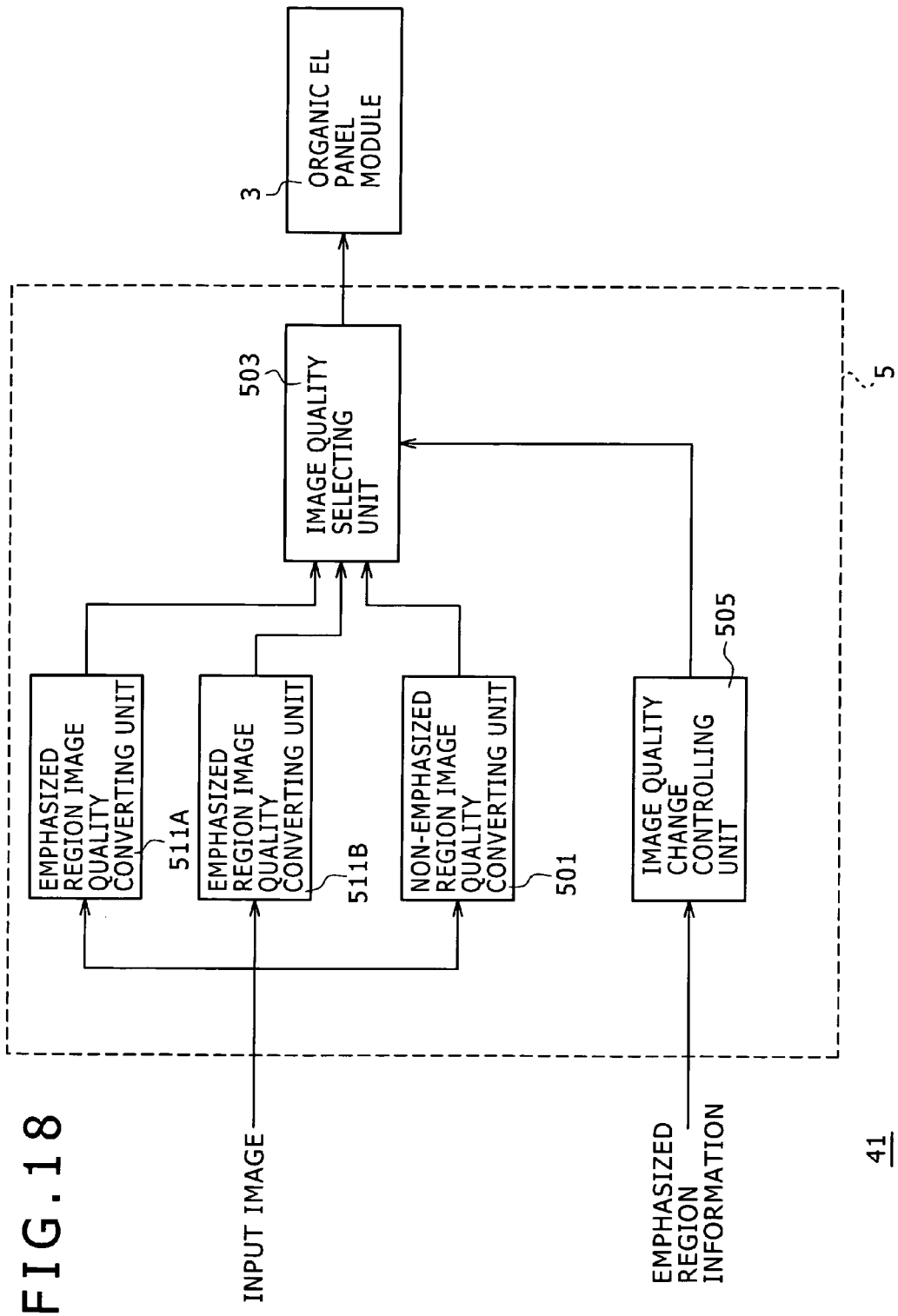

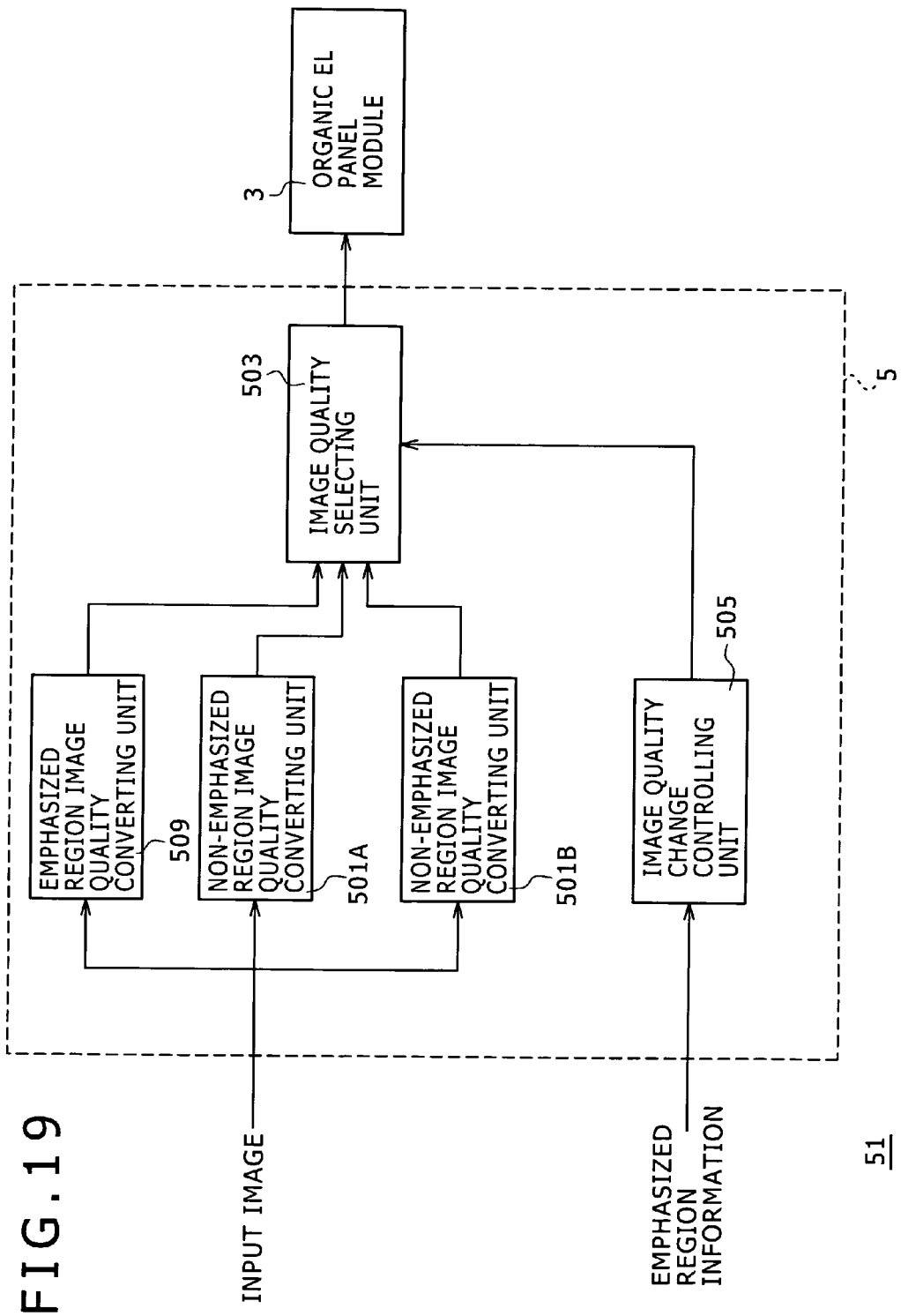

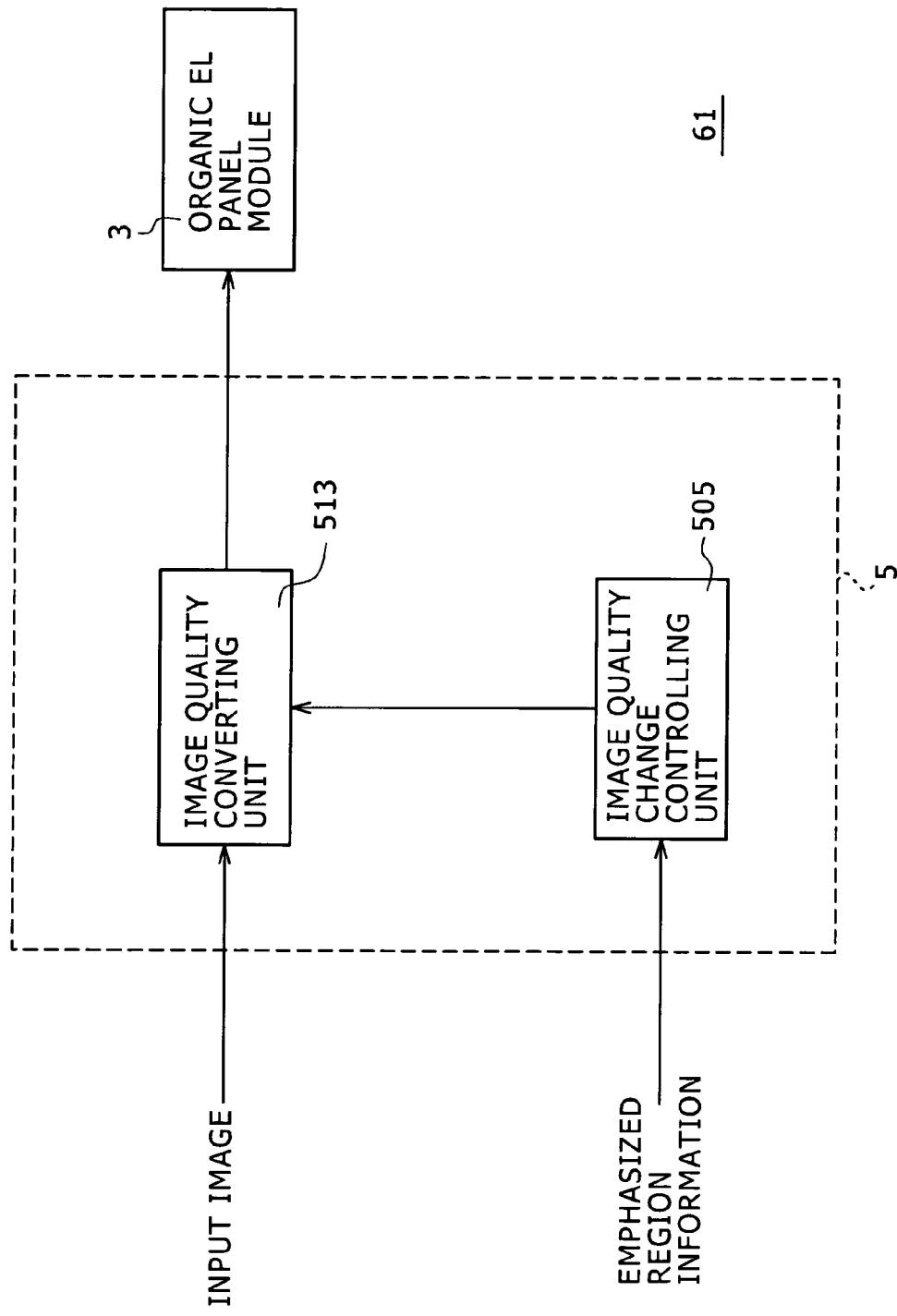

BY-REGION DISPLAY IMAGE QUALITY CONTROLLING DEVICE, SELF-LUMINOUS DISPLAY DEVICE, AND COMPUTER PROGRAM

TECHNICAL FIELD

The invention described in the present specification relates to a technique for improving visibility of an arbitrary specified region with power consumption taken into consideration.

Incidentally, the invention proposed by the inventor et al. has aspects as a by-region display image quality controlling device, a self-luminous display device, and a computer program.

BACKGROUND ART

Patent Document 1 discloses a technique of displaying an image of a selected display region (corresponding to an "emphasized display region" in the present specification) in an emphasized state.

In addition, Patent Document 2 discloses a technique of changing an operation mode to a luminance decrease, a reduced display, a display stop, and a power supply stop in this order when a state in which no person is present continues for a certain period or more.

Patent Document 1: Japanese Patent Laid-open No. Hei 8-320679
Patent Document 2: Japanese Patent Laid-Open No. 2000-242255

DISCLOSURE OF INVENTION

Technical Problem

However, when the technique described in Patent Document 1 is applied, there is a problem in that power consumption is increased at the same time.

On the other hand, the technique described in Patent Document 2 can reduce power consumption, but has a problem of uniformly lowering visibility.

Thus, the existing techniques can surely improve only visibility or power consumption. A mechanism that surely makes visibility and reduction in power consumption compatible with each other is desired.

Technical Solution

Accordingly, the inventor et al. propose a mechanism that, when an arbitrary position and an arbitrary size on a display screen are specified as an emphasized display region so as to be interlocked with a display content of an application program, only for another region part excluding the emphasized display region, aggressively reduces power consumed by the region part and simultaneously aggressively lowers image quality as compared with the emphasized display region.

Incidentally, in lowering the image quality of the other region part as compared with the emphasized display region, it is desirable that the screen luminance of the other region part be lowered uniformly, for example.

In addition, in lowering the image quality of the other region part as compared with the emphasized display region, it is desirable that only color information of a part of original picture data be displayed in only the other region part, for example.

Advantageous Effects

When the method proposed by the inventor et al. is used, the visibility of the emphasized display region can be enhanced by using a difference in outward appearance between the emphasized display region and the other region part. At the same time, because the power consumption of the other region part excluding the emphasized display region is aggressively lowered, the power consumption of a display device as a whole can be surely reduced. That is, visibility and reduction in power consumption can be made compatible with each other.

BRIEF DESCRIPTION OF DRAWINGS

FIG. 1 is a diagram showing an example (first form example) of functional configuration of an organic EL display device.

FIG. 2 is a diagram of assistance in explaining a change in gamma characteristic by gamma conversion.

FIG. 4 is a diagram showing the gamma characteristics of an emphasized display region and a non-emphasized display region.

FIG. 6 is a diagram showing an example (second form example) of functional configuration of an organic EL display device.

FIG. 18 is a diagram showing another example of functional configuration of an organic EL display device.

FIG. 19 is a diagram showing another example of functional configuration of an organic EL display device.

FIG. 20 is a diagram showing another example of functional configuration of an organic EL display device.

BEST MODE FOR CARRYING OUT THE INVENTION

Figure 3A:
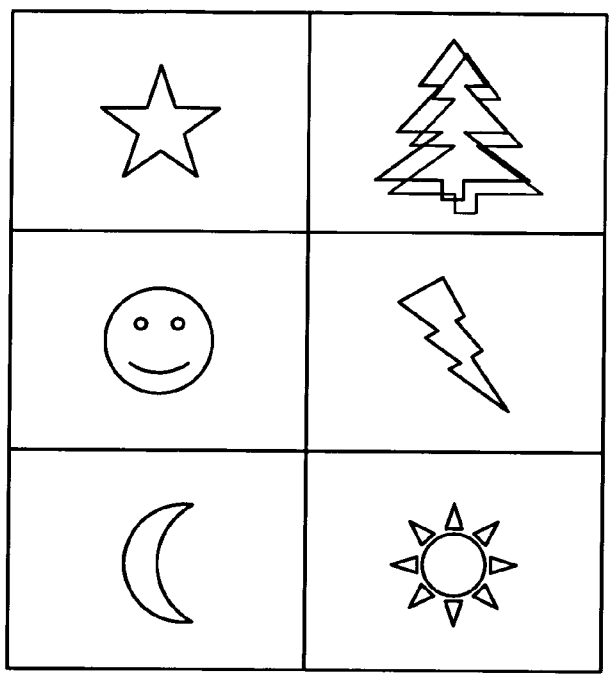
FIG. 3A is a diagram showing a display image when a by-region display image quality controlling function is performed.

By-region display image quality controlling techniques according to the present invention will hereinafter be described.

Incidentally, well known or publicly known techniques in a pertinent technical field are applied to parts not specifically shown or described in the present specification.

In addition, form examples to be described in the following are one form example of the invention, and there is no limitation to these.

(A) First Form Example

In the following, description will be made of a method of applying image processing in a direction of reducing power consumption only in a region other than a region desired to be emphasized (emphasized display region). This method realizes a reduction in power consumption of the whole of a display panel and an increase in difference in outward appearance (difference in luminance and difference in color) between regions. That is, description will be made of a method for enhancing visibility of the emphasized display region without changing the image quality of the emphasized display region.

(A-1) System Configuration

FIG. 1 shows an example of functional configuration of an organic EL display device incorporating this kind of image processing function. The organic EL display device 1 shown in FIG. 1 includes an organic EL panel module 3 and a by-region display image quality controlling unit 5.

The organic EL panel module 3 is a display device in which one pixel on display formed by three kinds of fundamental primary colors (R, G, and B) is arranged in the form of a matrix. Each of the fundamental primary colors is generated by an organic EL light emitting element.

The by-region display image quality controlling unit 5 includes a non-emphasized region image quality converting unit 501, an image quality selecting unit 503, and an image quality change controlling unit 505.

The non-emphasized region image quality converting unit 501 is a processing device for performing an image conversion process that greatly lowers both power consumption and image quality for another region (non-emphasized display region) excluding an emphasized display region.

An image quality adjusting parameter may be any parameter as long as the parameter can lower power consumption and degrade an image content to a degree where the image content is barely visible. For example, luminance, contrast, color saturation, hue, and various other parameters can be used.

The present form example adopts a method of changing a gamma characteristic that gives a correspondence between a gradation value and a luminance value. Gamma conversion is not only very simple but also expected to produce a great effect. The reason is that luminance can be suppressed greatly.

Incidentally, the non-emphasized region image quality converting unit 501 sets all pixels as a region to be subjected to the gamma conversion.

FIG. 2 represents a gamma conversion operation adopted in the present form example. FIG. 2 shows a gamma characteristic before the gamma conversion by a broken line, and shows a gamma characteristic after the gamma conversion by a solid line. As shown in FIG. 2, the non-emphasized region image quality converting unit 501 in the present form example adopts a method of lowering the whole of luminance levels associated with gradation values while retaining the characteristic of a gamma curve as it is (without changing a gamma value).

The image quality selecting unit 503 is a processing device that selectively outputs one of input image data and gamma-converted input image data. The selecting operation is performed in pixel units.

The image quality change controlling unit 505 is a processing device that controls the operation of changing the image data by the image quality selecting unit 503. The image quality change controlling unit 505 gives an instruction to select the input image data for an emphasized display region, and gives an instruction to select the gamma-converted input image data for another region.

Incidentally, information specifying an emphasized display region includes information providing the position of the emphasized display region (for example the pixel coordinates of a starting point position) and information providing size (for example the number of pixels in a horizontal direction and the number of pixels in a vertical direction). The information specifying the emphasized display region is supplied from an application program so as to be interlocked with content display.

That is, suppose that the application program in this case incorporates a function of specifying a region in which information of high priority is described, a region in which information receiving a high degree of attention is described, a region in which information used with a high frequency is described, and others so as to be interlocked with a display content.

(A-2) Emphasized Display Operation

Figure 3B:
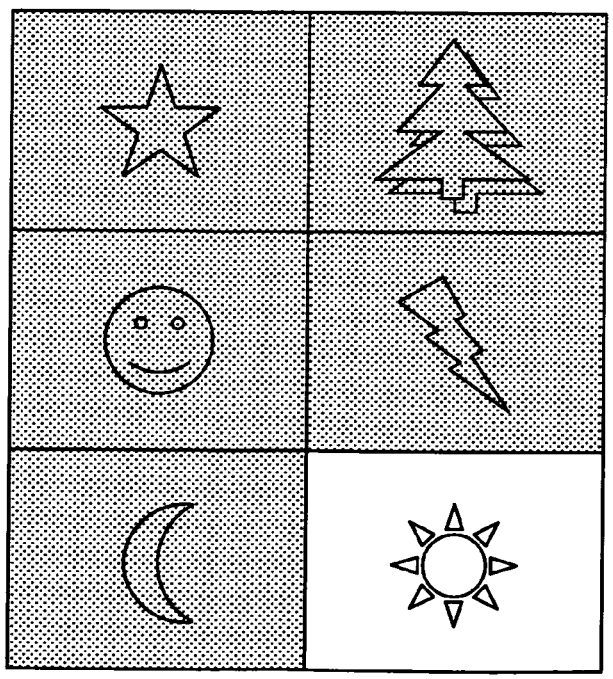
FIG. 3B is a diagram showing a display image when the by-region display image quality controlling function is performed.
Figure 5A:
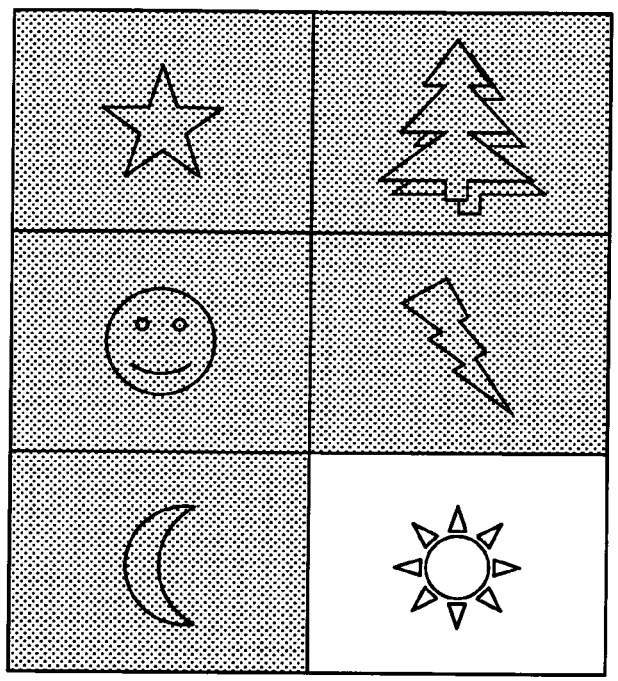
FIG. 5A is a diagram showing a display image when a by-region display image quality controlling function is performed.
Figure 5B:
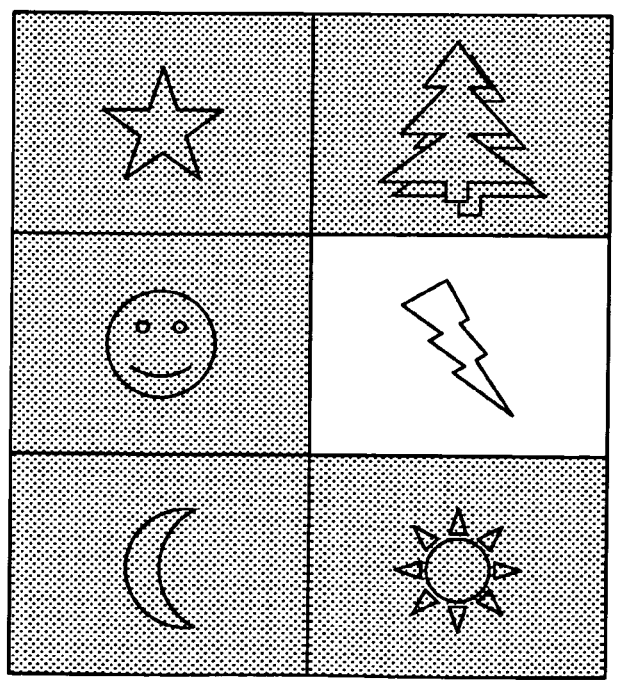
FIG. 5B is a diagram showing a display image when the by-region display image quality controlling function is performed.
Figure 5C:
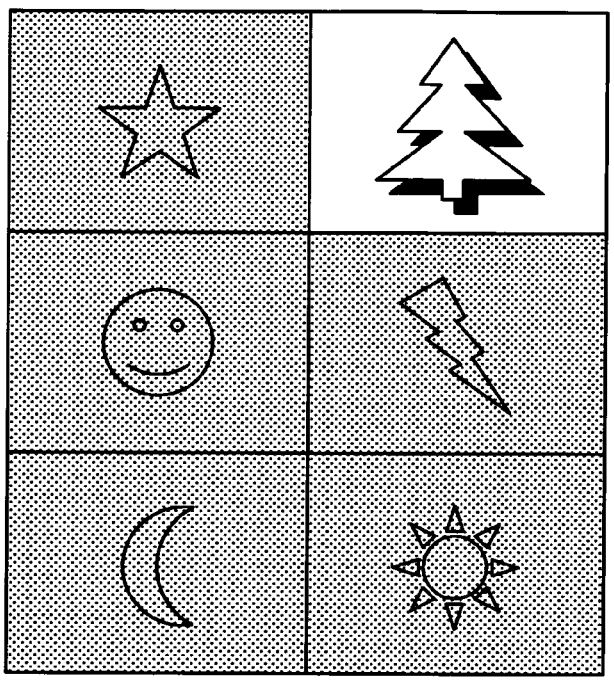
FIG. 5C is a diagram showing a display image when the by-region display image quality controlling function is performed.
Figure 5D:
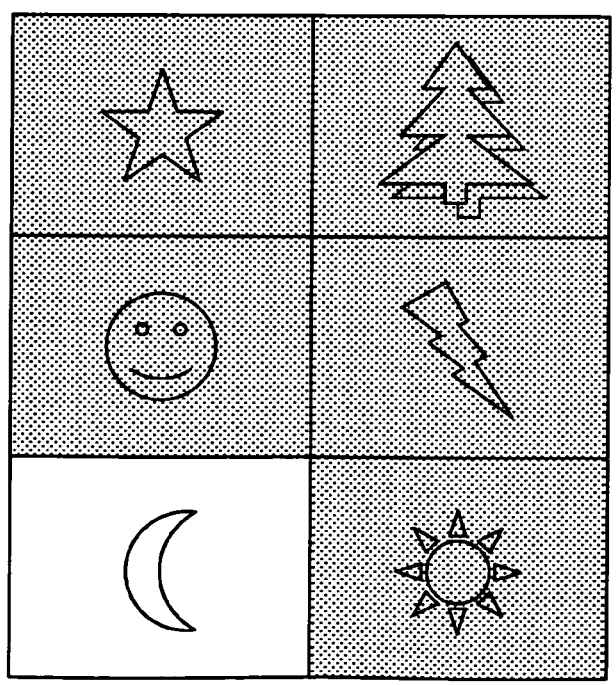
FIG. 5D is a diagram showing a display image when the by-region display image quality controlling function is performed.
Figure 5E:
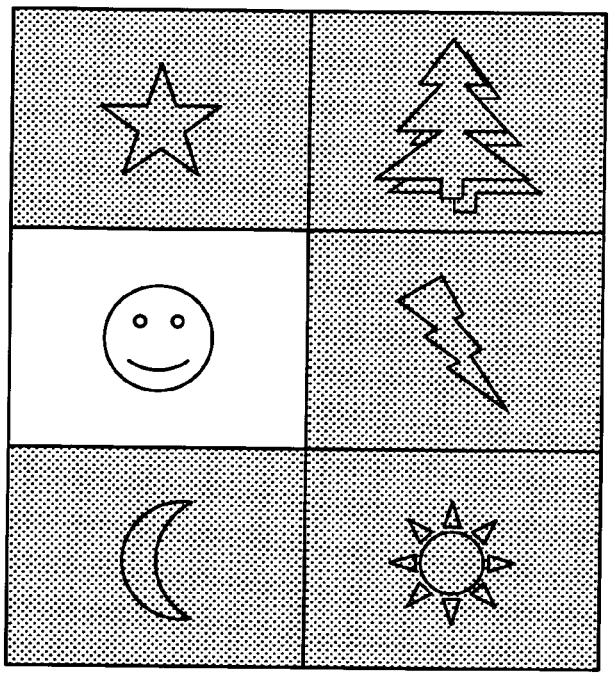
FIG. 5E is a diagram showing a display image when the by-region display image quality controlling function is performed.
Figure 5F:
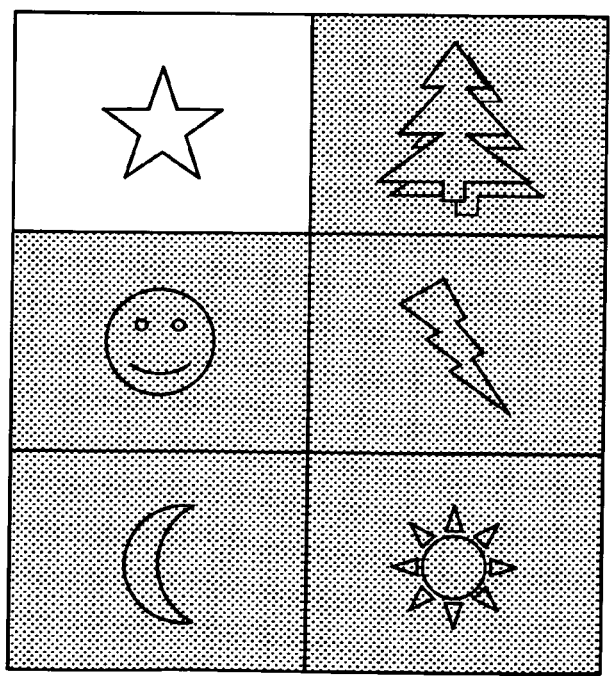
FIG. 5F is a diagram showing a display image when the by-region display image quality controlling function is performed.

FIG. 3A and FIG. 3B show an example of a display image when a by-region display image quality controlling function is performed. FIG. 3A and FIG. 3B are a display image when thumbnail display of photographs or the like is made in the form of a list. FIG. 3A and FIG. 3B represent a case where two thumbnail images in a horizontal direction and three thumbnail images in a vertical direction are displayed in a list.

FIG. 3A is an image of original pictures. That is, FIG. 3A is an image when input image data is displayed as it is.

FIG. 3B is an example of display when a thumbnail image at a lower right is selected as an emphasized display region. As shown in FIG. 3B, another region part excluding the emphasized display region is greatly decreased in luminance.

Due to this difference in luminance, the emphasized display region is displayed in a relatively emphasized manner as if the emphasized display region were spotlighted.

FIG. 4 shows relation in luminance between the emphasized display region and the non-emphasized display region. In the figure, the gamma characteristic of the emphasized display region is represented by a broken line, and the gamma characteristic of the non-emphasized display region is represented by a solid line.

It is shown that the non-emphasized display region as a whole is decreased in luminance level. Thus, gradation reproducibility at low gradation levels is somewhat impaired. However, because fundamental gradation relation is maintained (the gamma value is not changed), the non-emphasized display region is shown naturally. In addition, the image quality of the non-emphasized display region does not present a problem because of dark screen luminance in the non-emphasized display region.

Incidentally, because organic EL light emitting elements forming the organic EL panel module 3 are self-luminous display elements, the lower the light emission luminance, the lower the power consumption. Therefore, displaying the non-emphasized display region at low luminance itself means that the power consumption can be surely reduced.

Now, for a greater effect of reducing the power consumption, it is desirable to increase a degree of gamma conversion as much as possible.

However, when luminance is lowered too much by gamma conversion, even recognizing the content of an image present in the non-emphasized display region becomes impossible.

Accordingly, in the present form example, a decrease in image quality due to the lowering of luminance is limited to a certain degree, and a certain degree of visibility of the non-emphasized display region is secured. A user can thereby grasp the screen structure of the screen as a whole, and determine which region is specified as an emphasized display region and what display items or images are present in the other region.

FIGS. 5A to 5F show examples of display when the emphasized display region is moved by operation of the user. An input for the movement of the emphasized display region is performed via a pointing device (for example a pointer) not shown in the figures, and the application program recognizes the input for the movement of the emphasized display region. The application program thereafter supplies information giving the emphasized display region to the image quality change controlling unit 505, whereby the movement of the emphasized display region as shown in FIGS. 5A to 5F is realized.

(A-3) Effect

As described above, the input image data is displayed as it is in the emphasized display region, and an image obtained by greatly lowering the power consumption and the image quality of the input image data is selectively displayed in only the non-emphasized display region. It is thereby possible to realize a display technique that surely achieves both of visibility and a reduction in power consumption.

Incidentally, the power saving of the organic EL panel module 3 also leads to an effective reduction in power consumption of the organic EL display device as a whole. Consequently, an electricity charge can also be saved.

In addition, only a small circuit scale and a small amount of calculation are necessary to realize the display technique. Thus, the by-region display image quality controlling unit 5 can also be implemented as a part of an integrated circuit of a timing generator or the like. In this case, an existing peripheral circuit is not affected, which is advantageous to manufacturing.

(B) Second Form Example

In the following, another processing method for generating an image for a non-emphasized display region will be described as an example of modification of the first form example. Incidentally, the present form example is effective especially in a case where input image data is a color image.

(B-1) System Configuration

FIG. 6 shows an example of functional configuration of an organic EL display device incorporating this kind of image processing function. Incidentally, in FIG. 6, parts corresponding to those of FIG. 1 are identified by the same reference characters.

As shown in FIG. 6, the organic EL display device 11 has the same basic block configuration as the organic EL display device 1 shown in FIG. 1.

A difference is an image quality reducing method carried out in a non-emphasized region image quality converting unit 507. The non-emphasized region image quality converting unit 507 is a processing device that reduces a color image to a monochrome color image. That is, processing is performed to generate image data for performing control to emit light by only organic EL light emitting elements corresponding to one fundamental primary color and performing control to turn off organic EL light emitting elements corresponding to the other two fundamental primary colors.

(B-2) Emphasized Display Operation

Figure 7:
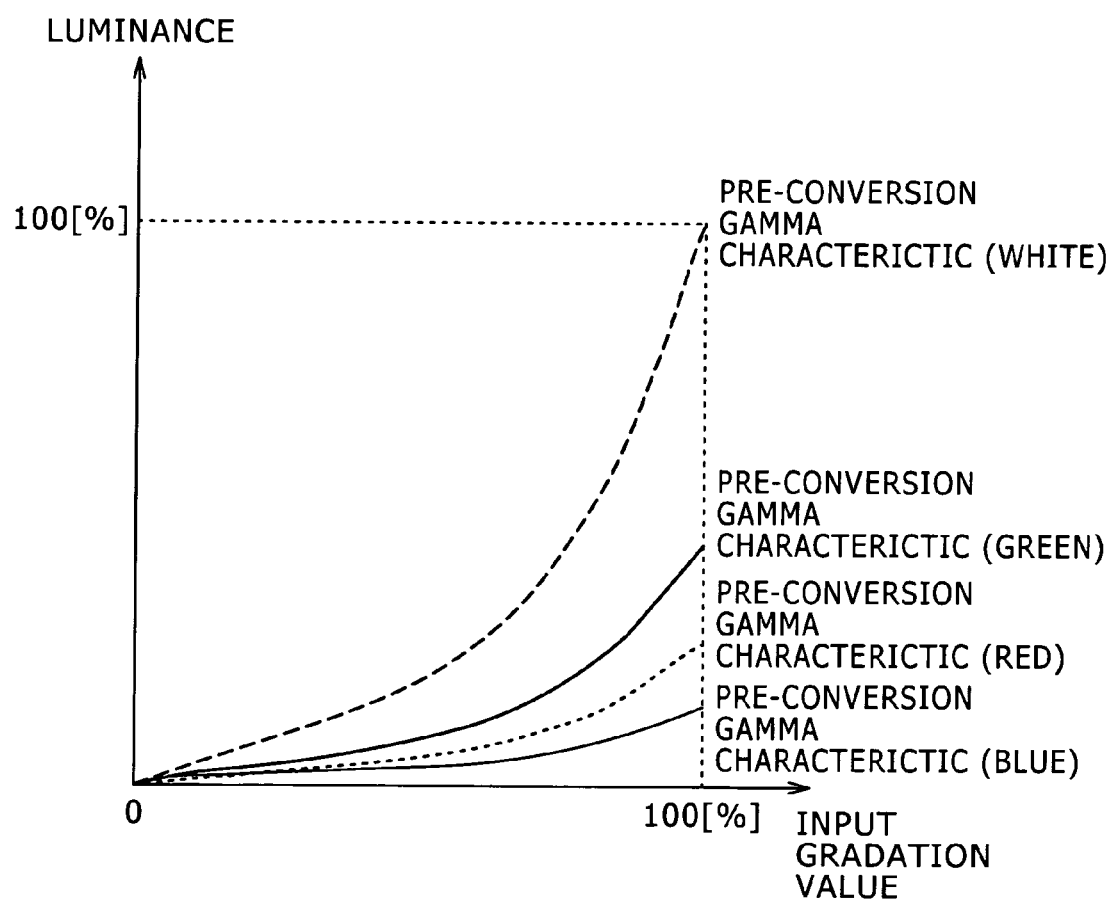
FIG. 7 is a diagram of explaining gamma characteristics before gamma conversion.

FIG. 7 shows gamma characteristics before image quality conversion. The gamma characteristic represented by a broken line in FIG. 7 corresponds to a gamma characteristic when control is performed to emit light in all of the fundamental primary colors. The gamma characteristics represented by a thick line, a dotted line, and a thin line correspond to gamma characteristics when a green monochrome image, a red monochrome image, and a blue monochrome image are displayed, respectively.

The non-emphasized region image quality converting unit 507 selectively outputs only a piece of fundamental primary color data for one color among three pieces of fundamental primary color data forming the input image data. A simple consideration shows that the conversion to a single primary color can reduce luminance to $\frac{1}{3}$ of luminance of the three primary colors. Suppose that in the present form example, only blue color data is selected.

Figure 8:
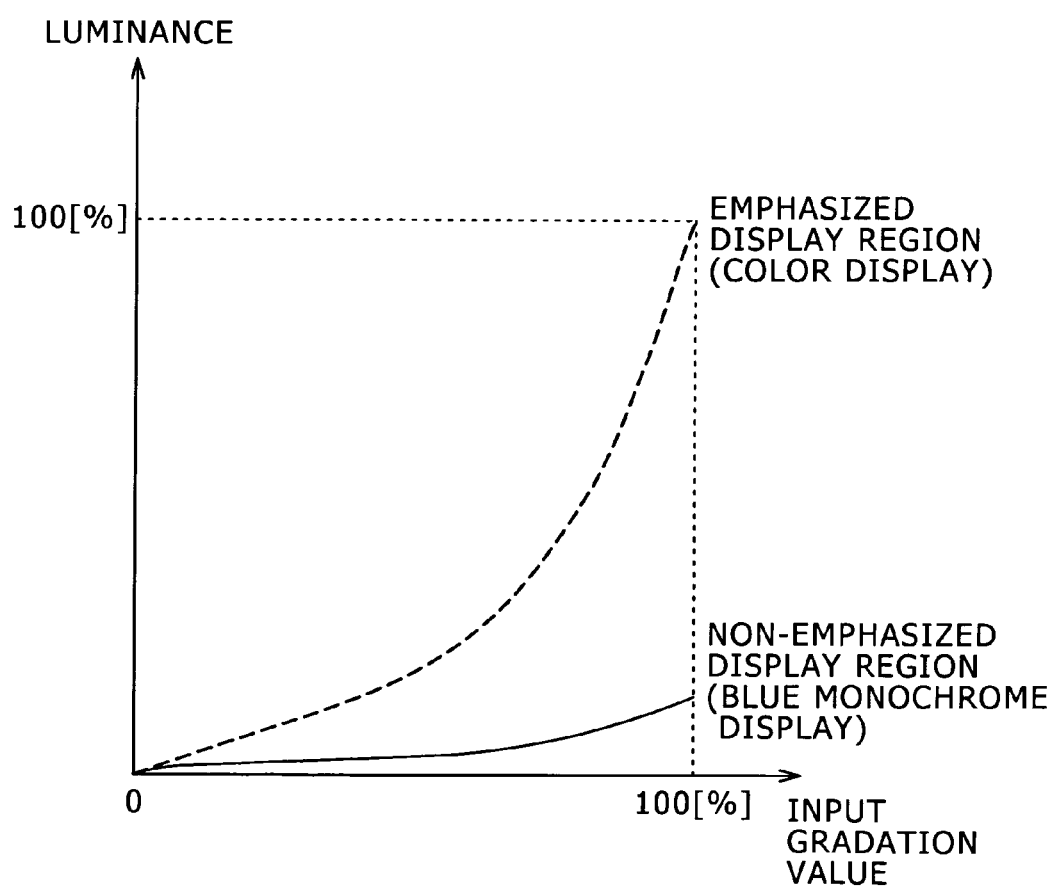
FIG. 8 is a diagram of explaining the gamma characteristics of an emphasized display region and a non-emphasized display region after the gamma conversion.

FIG. 8 shows relation in luminance between an emphasized display region and a non-emphasized display region in this case. In the figure, the gamma characteristic of the emphasized display region is represented by a broken line, and the gamma characteristic of the non-emphasized display region is represented by a solid line. It is shown that a very great difference in luminance occurs as a result of converting display in the non-emphasized display region to an image of a single blue color. This substantial decrease in luminance exerts an effect of substantially reducing power consumption.

In addition, converting a color image, which is originally a combination of three kinds of fundamental primary color images, to a monochrome image greatly degrades image quality. However, as in the case of the first form example, a display content can be roughly recognized even with only the blue color.

(B-3) Effect

As described above, also in the present form example, a difference in outward appearance between the emphasized display region and the non-emphasized display region can be increased while power consumption is aggressively reduced. Hence, excellent image quality and visibility of the emphasized display region can be secured. In addition, selecting the display color of the non-emphasized display region can adjust the outward appearance of the emphasized display region and a power saving effect.

(C) Third Form Example

In the following, description will be made of a processing method of adjusting screen luminance used in a non-emphasized display region so as to be interlocked with an operation of adjusting the light emission luminance of an organic EL panel module 3, and realizing power saving on a screen as a whole.

(C-1) System Configuration

Figure 9:
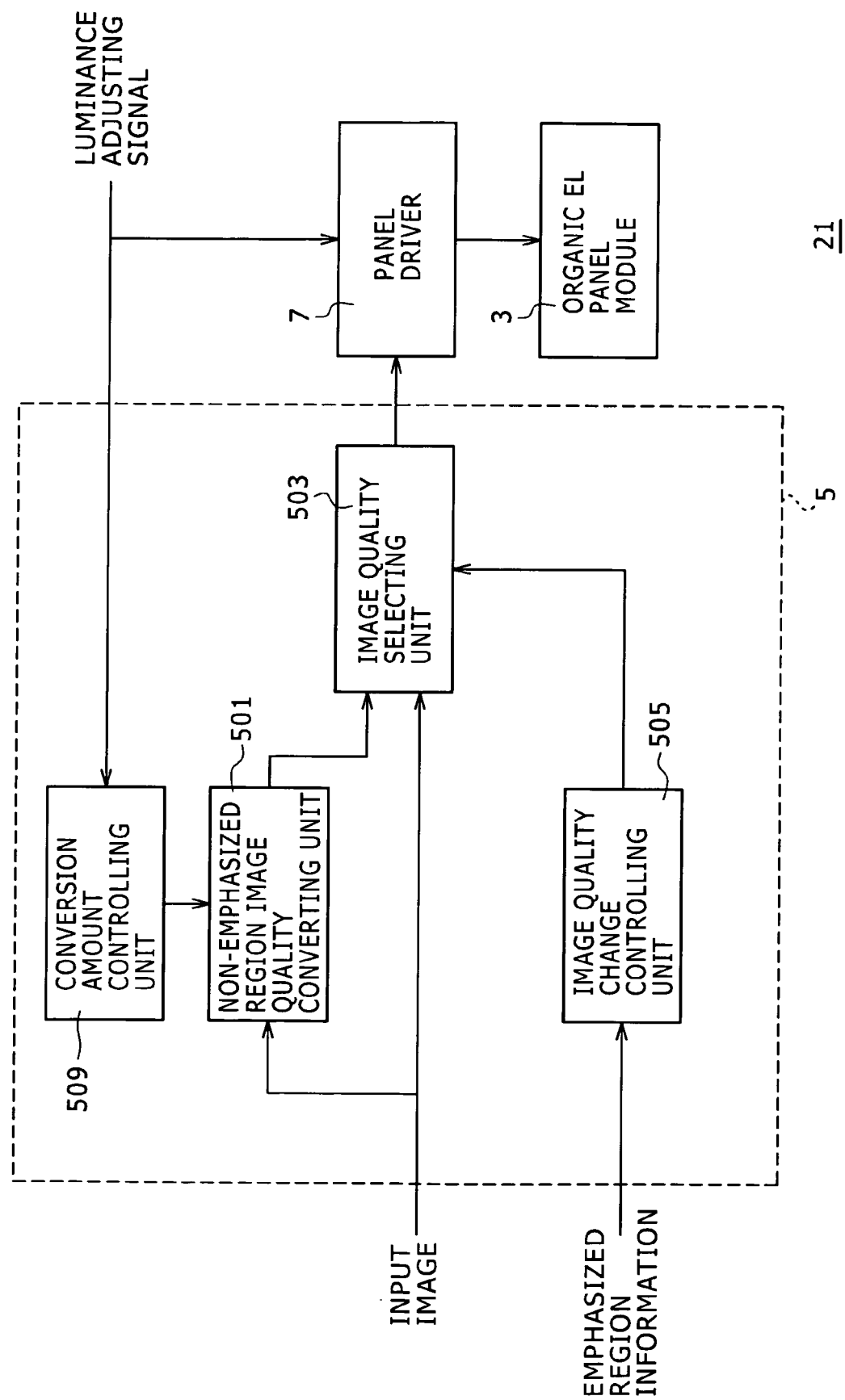
FIG. 9 is a diagram showing an example (third form example) of functional configuration of an organic EL display device.

FIG. 9 shows an example of functional configuration of an organic EL display device incorporating this kind of image processing function. Incidentally, in FIG. 9, parts corresponding to those of FIG. 1 are identified by the same reference characters.

As shown in FIG. 9, the organic EL display device 21 has the same basic block configuration as the organic EL display device 1 shown in FIG. 1.

In the present form example, a panel driver 7 is clearly shown to describe adjustment of luminance of an organic EL panel module 3 according to a luminance adjusting signal. The panel driver 7 is also used in the other form examples described above. In this case, the panel driver 7 is formed on the same panel as the organic EL panel module 3.

In addition, in the present form example, a conversion amount controlling unit 509 is incorporated for adjustment of luminance in a non-emphasized display region according to the luminance adjusting signal.

The conversion amount controlling unit 509 functions to decrease the luminance of the non-emphasized display region by an amount of increase in luminance based on the luminance adjusting signal. Incidentally, the amount of decrease in luminance is determined in consideration of an amount of power consumed ultimately. A relation to the amount of decrease of the non-emphasized display region corresponding to the amount of increase in luminance can be determined by an advance experiment.

Suppose that the relation determined by the experiment is stored in the conversion amount controlling unit 509. Incidentally, to be exact, an area ratio between an emphasized display region and the non-emphasized display region also has an effect. Thus, when exact control is to be realized, a mechanism is adopted in which emphasized region information is input also to the conversion amount controlling unit 509 and referred to at a time of adjustment of the conversion amount.

(C-2) Principles of Screen Luminance Adjustment

In the following, description will be made of a peak luminance adjusting operation realized by the panel driver 7.

Figure 10:
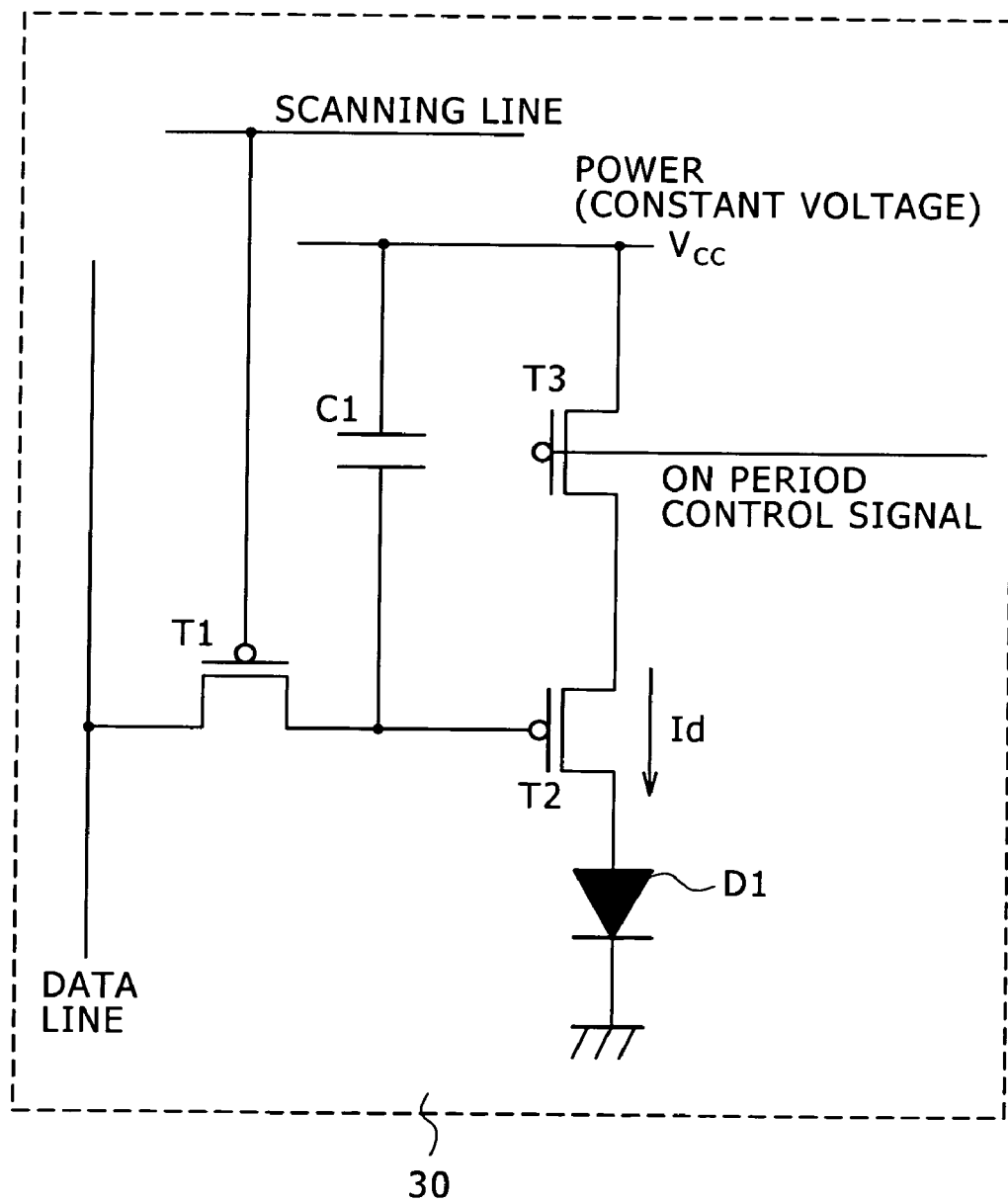
FIG. 10 is a diagram showing an example of a driving circuit of each pixel.

FIG. 10 shows an example of a driving circuit for controlling the light emitting operation of each individual organic EL element.

A driving circuit 30 is disposed at the position of an intersection of a data line and a scanning line. The driving circuit 30 includes a data switch element T1, a capacitor C1, a current supplying element T2, and a light emission period controlling element T3.

In this case, the data switch element T1 is a transistor for controlling the taking in of the value of a voltage supplied through the data line. Take-in timing is given on a line sequential basis through the scanning line.

The capacitor C1 is an element for retaining the taken-in value of the voltage for the period of one frame. Surface sequential driving is realized by using the capacitor C1.

The current supplying element T2 is a transistor for supplying a driving current corresponding to the value of the voltage of the capacitor C1 to the organic EL light emitting element D1.

The light emission period controlling element T3 is a transistor for controlling the supplying and stopping of the driving current to the organic EL light emitting element D1.

The light emission period controlling element T3 is disposed in series with a path for supplying the driving current. The organic EL light emitting element D1 is on while the light emission period controlling element T3 is performing on operation. On the other hand, the organic EL light emitting element D1 is off while the light emission period controlling element T3 is performing off operation.

In the present example, the opening and closing operation of the light emission period controlling element T3 is realized by an on period control signal.

In the case of this circuit configuration, the adjustment of screen luminance is realized through adjustment of the light emission period of the organic EL light emitting element D1.

Figure 11:
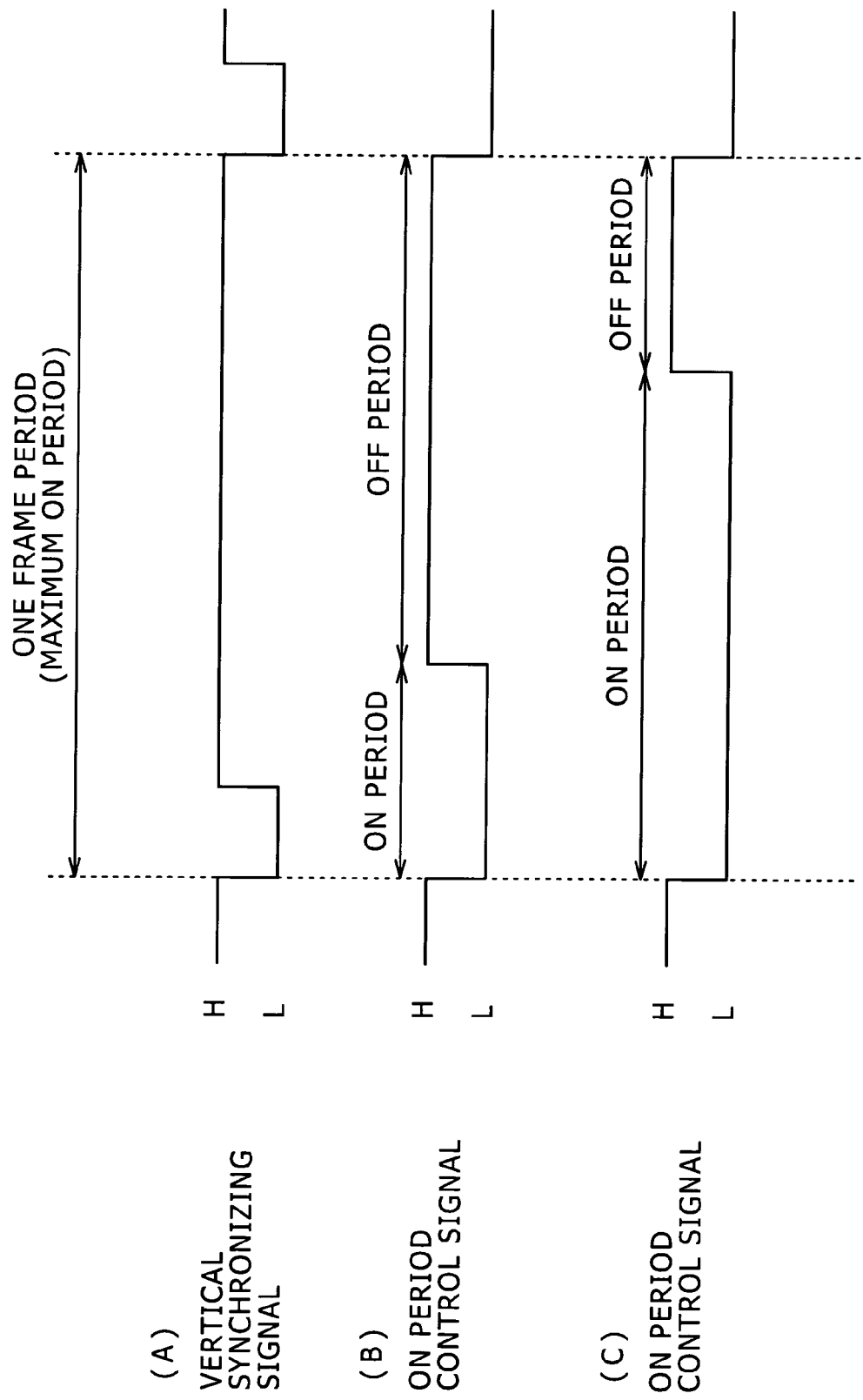
FIG. 11 is a diagram of explaining variable operation for an on period.

FIG. 11 shows an example of the on period control signal for controlling the state of operation of the light emission period controlling element T3. Incidentally, FIG. 11(A) is a vertical synchronizing signal. A period interposed between vertical pulses corresponds to one frame period.

FIGS. 11(B) and 11(C) are an on period control signal. The on period control signal is a signal for controlling a rate of a time during which the organic EL light emitting element D1 is on within one frame. In the present form example, an "L" level period corresponds to the on time. Therefore, the panel driver 7 variably controls the "L" level period (light emission period) of the on period control signal so as to achieve screen luminance specified by the luminance adjusting signal.

Incidentally, the achievement of the screen luminance specified by the luminance adjusting signal can also be realized by adjusting a power supply voltage Vcc.

Figure 12:
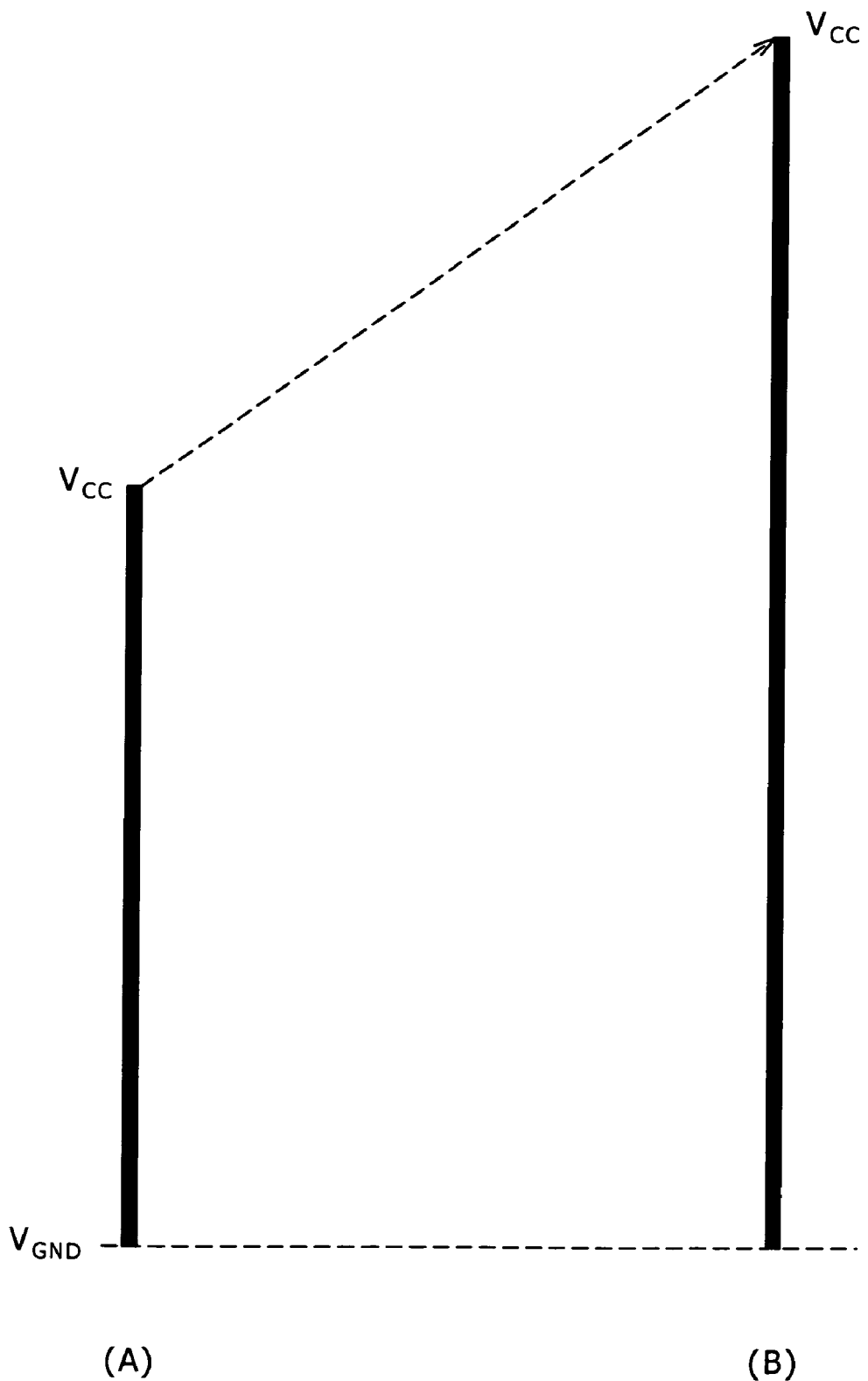
FIG. 12 is a diagram of explaining an operation of controlling a power supply voltage.

FIG. 12 shows an example of supply of the power supply voltage Vcc. FIG. 12(A) is the power supply voltage Vcc before luminance adjustment based on the luminance adjusting signal. On the other hand, FIG. 12(B) is the power supply voltage Vcc after the luminance adjustment based on the luminance adjusting signal.

As shown in FIG. 12(B), control can be effected such that an amount of current flowing through the organic EL display element D1 is increased by raising the power supply voltage Vcc and light emission luminance becomes correspondingly higher even with a same gradation value.

(C-3) Emphasized Display Operation

Figure 13:
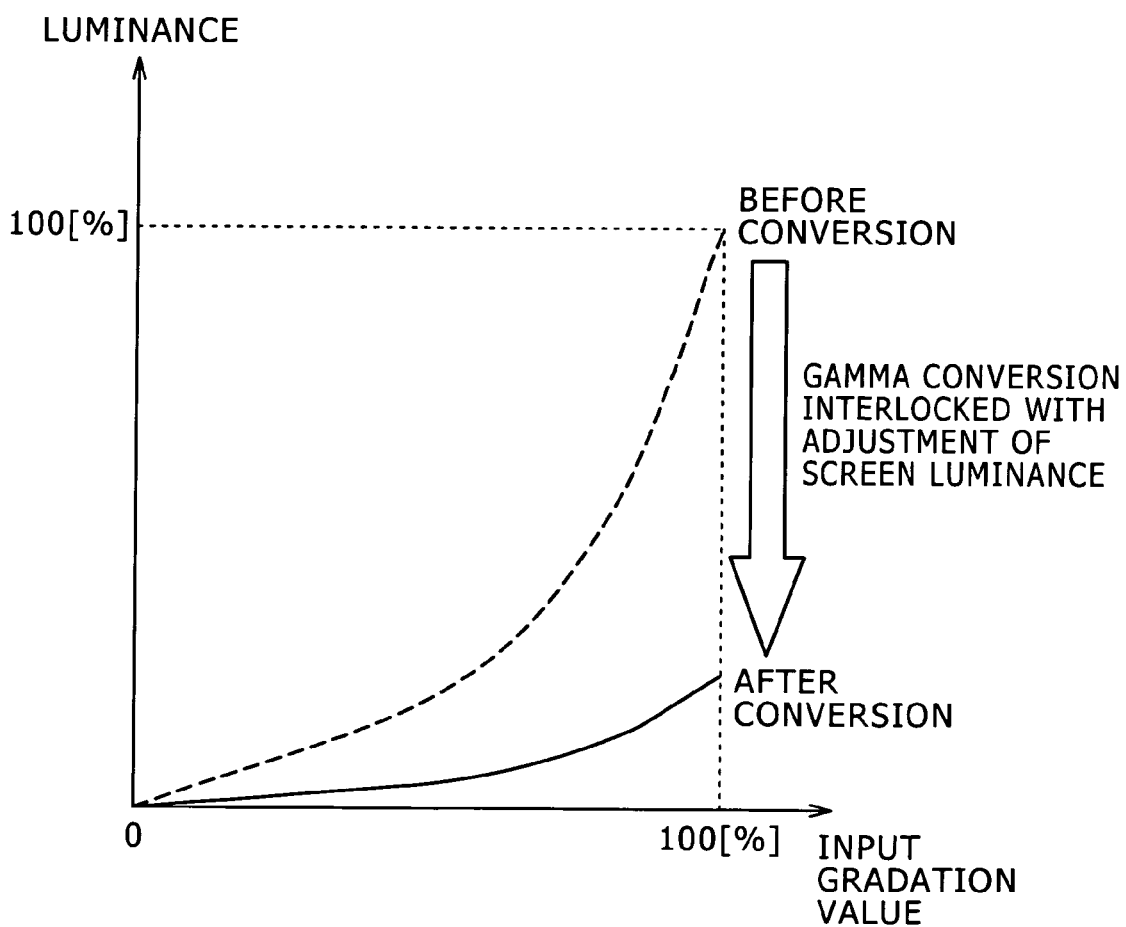
FIG. 13 is a diagram of explaining a change in gamma characteristic involved in gamma conversion interlocked with adjustment of screen luminance.

FIG. 13 shows relation in luminance between an emphasized display region and a non-emphasized display region at a time of being selectively output by an image quality selecting unit 503. In the figure, the gamma characteristic of the emphasized display region is represented by a broken line, and the gamma characteristic of the non-emphasized display region is represented by a solid line. Incidentally, the peak luminance of the non-emphasized display region is converted in advance to a low value in consideration of an ultimate increase in luminance.

Figure 14:
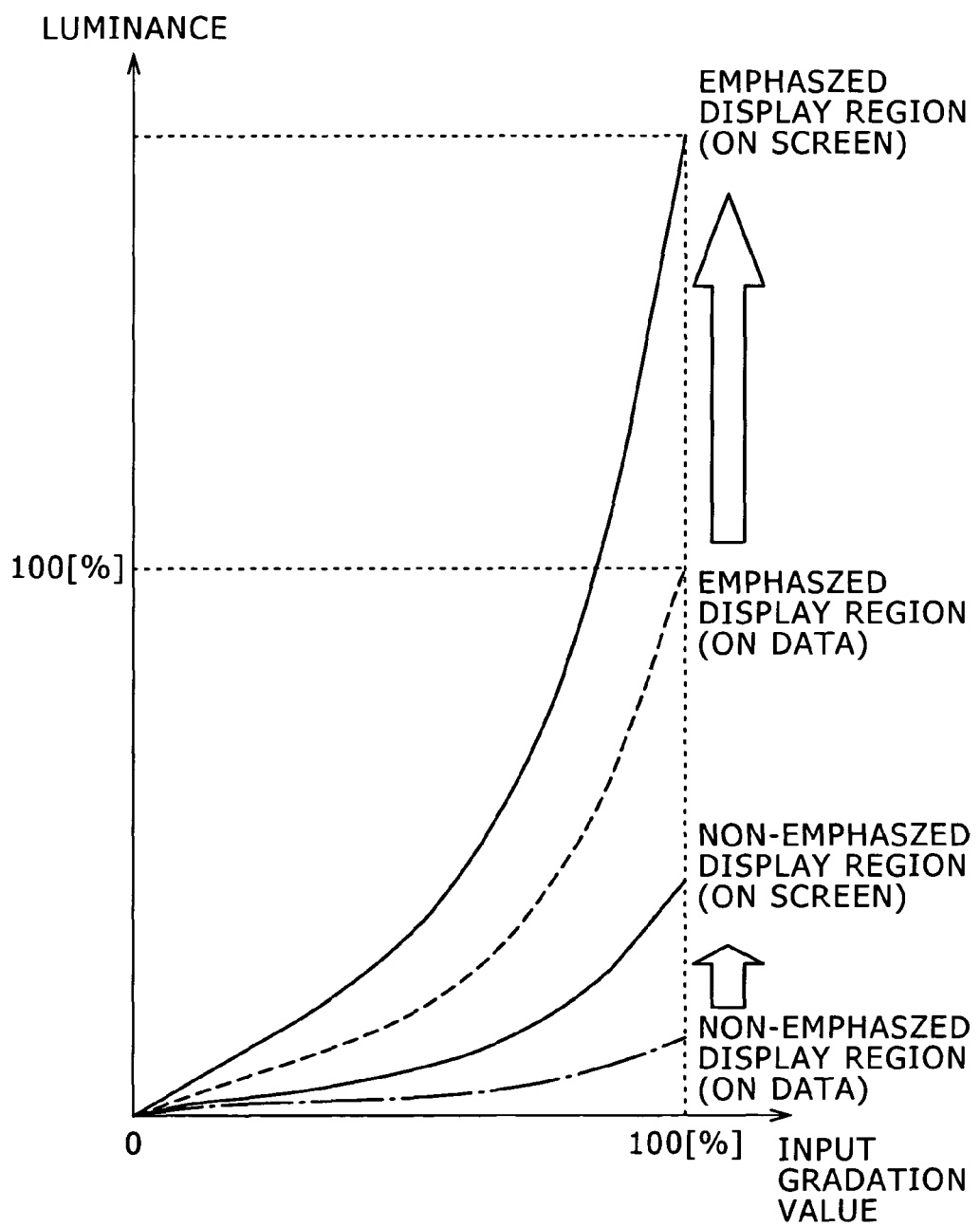
FIG. 14 is a diagram showing the gamma characteristics of an emphasized display region and a non-emphasized display region confirmed on a screen.

FIG. 14 shows relation in luminance between the emphasized display region and the non-emphasized display region on a screen. As shown in FIG. 14, supposing that the luminance of the emphasized display region before adjustment based on the luminance adjusting signal is 100%, the luminance of the emphasized display region is displayed at a luminance of 100% or higher. On the other hand, while the luminance of the non-emphasized display region is brighter than the luminance before the adjustment based on the luminance adjusting signal, the luminance of the non-emphasized display region is displayed in a considerably darker state as compared with the emphasized display region.

Figure 15A:
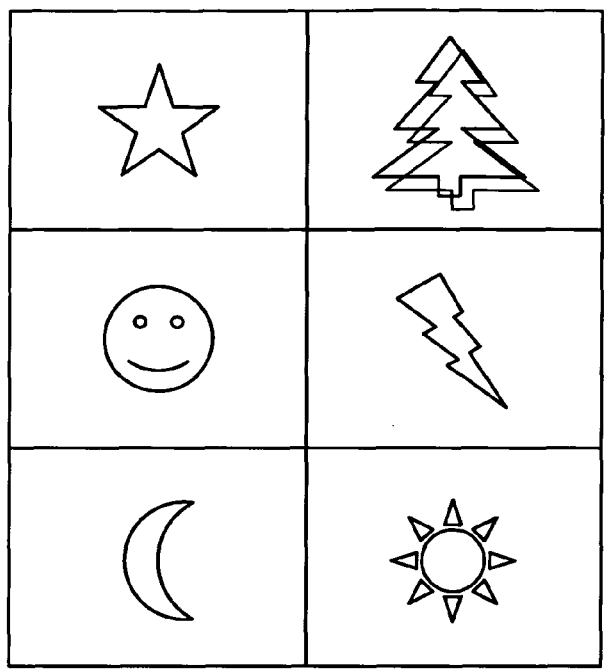
FIG. 15A is a diagram showing a display image when a by-region display image quality controlling function is performed.
Figure 15B:
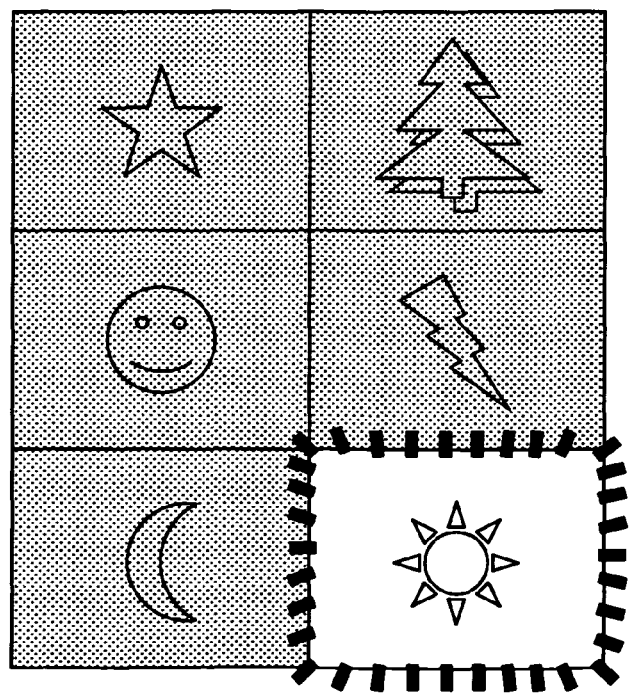
FIG. 15B is a diagram showing a display image when the by-region display image quality controlling function is performed.

FIG. 15A and FIG. 15B show an example of a display image when a by-region display image quality controlling function is performed. FIG. 15A and FIG. 15B are an example of display of a screen corresponding to FIG. 3A and FIG. 3B.

FIG. 15A is an image of original pictures. That is, FIG. 15A is an image when input image data is displayed as it is.

FIG. 15B is an example of display when a thumbnail image at a lower right is selected as an emphasized display region. As shown in FIG. 15B, in the present form example, the emphasized region information can be displayed in a brighter mode than the original picture. Hence, a difference in luminance between the emphasized display region and the non-emphasized display region is increased, and visibility can be enhanced more.

(C-4) Effect

As in the present form example, the luminance level of the non-emphasized display region part is converted to a lower luminance level so as to be interlocked with the operation of increasing the luminance of the screen as a whole, and power saving as a whole can be realized, whereby the visibility of the emphasized display region can be enhanced more.

Incidentally, the controlling function in this case is the same as allocating an amount of power reduction in the non-emphasized display region to an increase in image quality (an increase in luminance) in the emphasized display region.

In addition, the controlling function in the present form example is very effective when incorporated in an organic EL display device often used outdoors or under sunlight.

That is, an effect of power saving as a whole can be maintained even when screen luminance is increased to secure visibility of the emphasized display region.

(D) Fourth Form Example

In the foregoing form examples, description has been made of a case where only the quality of an image displayed in a non-emphasized display region is decreased. In this case, a mechanism may be adopted which incorporates a processing device that converts input image data so as to further increase the image quality of an emphasized display region.

(D-1) System Example

Figure 16:
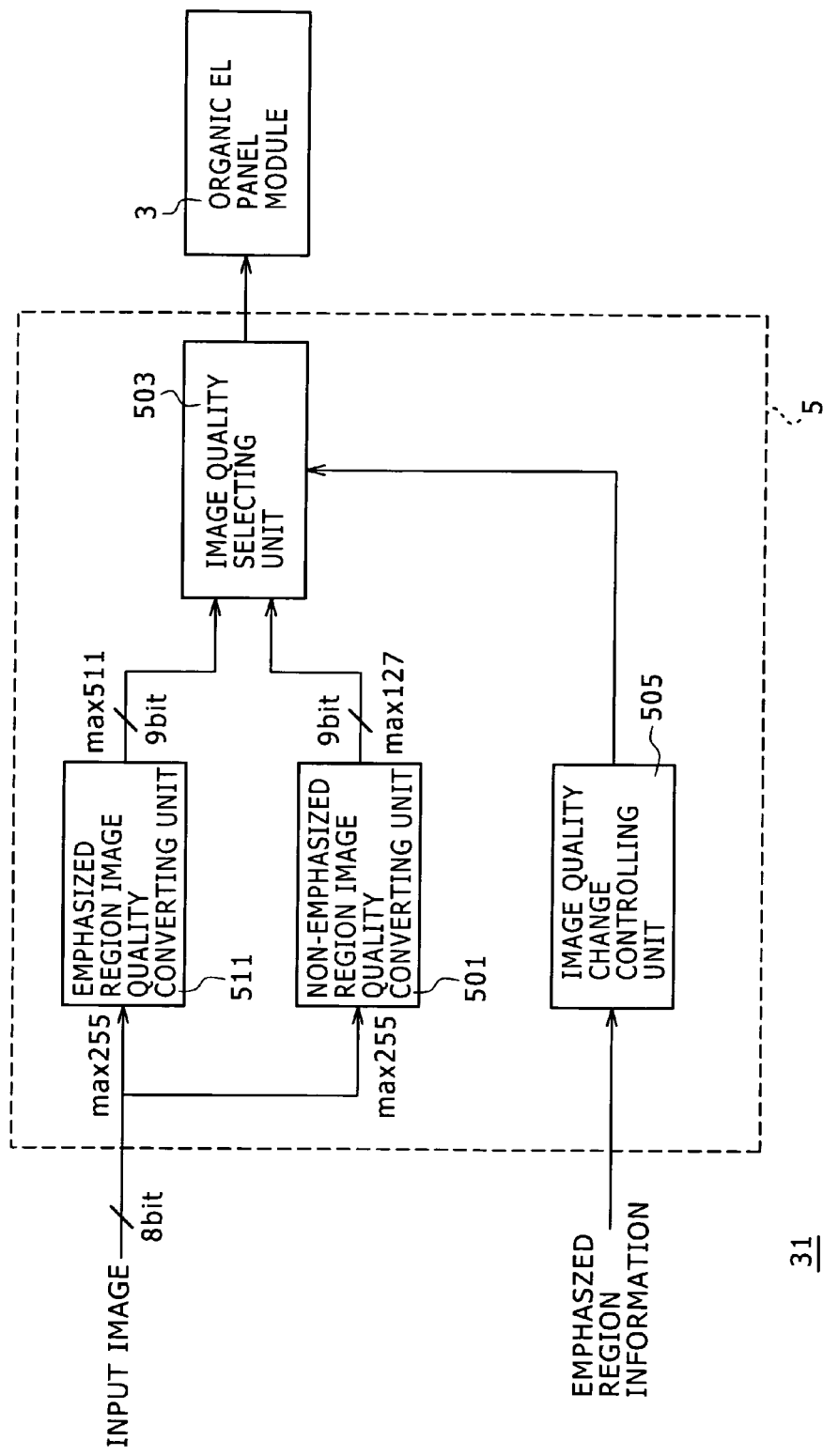
FIG. 16 is a diagram showing an example (fourth form example) of functional configuration of an organic EL display device.

FIG. 16 shows an example of configuration of an organic EL display device 31 incorporating this kind of image processing function. In FIG. 16, parts corresponding to those of FIG. 1 are identified by the same reference characters. An emphasized region image quality converting unit 511 is newly incorporated in the organic EL display device 31.

Incidentally, suppose that the non-emphasized region image quality converting unit 501 and the emphasized region image quality converting unit 511 each change the whole of luminance levels associated with gradation values while retaining the characteristic of a gamma curve as it is (without changing a gamma value).

In addition, suppose that the non-emphasized region image quality converting unit 501 and the emphasized region image quality converting unit 511 simultaneously perform an operation of converting the number of bits. Suppose that in the present form example, input image data whose gradation value is given by 8 bits is converted to image data whose gradation value is given by 9 bits.

Incidentally, suppose that even when the gradation value of image data is given by nine bits, an organic EL panel module 3 used in the present form example can control light emission luminance according to the gradation value.

Suppose that in the present example, the emphasized region image quality converting unit 511 performs gamma conversion of the gradation value of input image data to a gradation value of "0" to "511". That is, suppose that a maximum luminance is changed to twice that of an original picture. Of course, the maximum luminance is not limited to twice that of the original picture, and may be in a range of about 1.5 times to about 3 times that of the original picture.

Incidentally, because an emphasized display region occupies a relatively small percentage of the whole of the screen, an amount of increase in power consumption in the emphasized display region part can be held low within about this range. Then, it is considered that the amount of increase in power consumption can be sufficiently cancelled by power saving attendant on a decrease in luminance in a non-emphasized display region part.

Incidentally, in the present form example, the non-emphasized region image quality converting unit 501 performs gamma conversion of the gradation value of input image data to a gradation value of "0" to "127". That is, suppose that a maximum luminance is changed to half that of an original picture.

(D-2) Emphasized Display Operation

Figure 17:
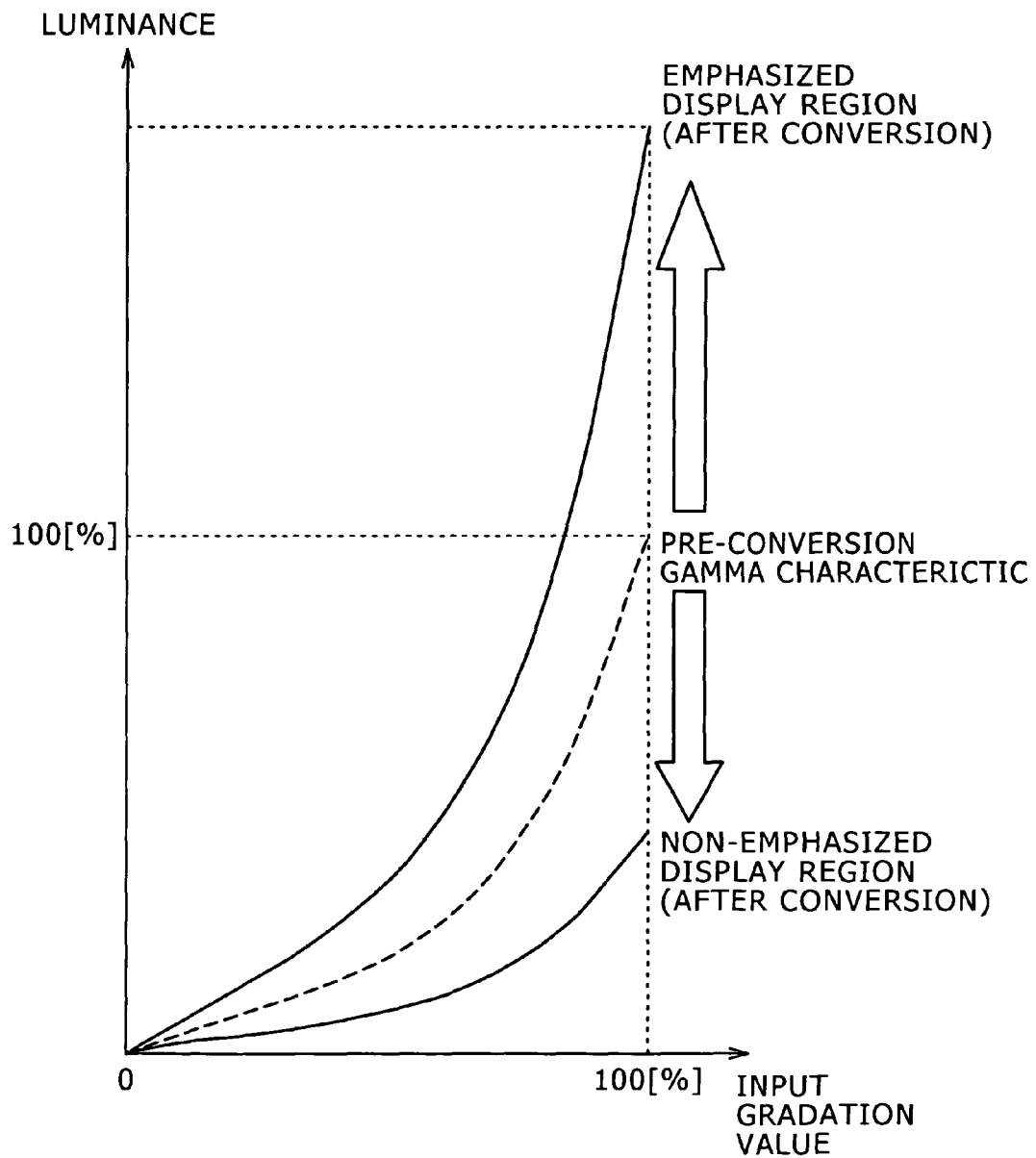
FIG. 17 is a diagram showing the gamma characteristics of an emphasized display region and a non-emphasized display region.

FIG. 17 shows relation in luminance between the emphasized display region and the non-emphasized display region at a time of performing emphasized display operation corresponding to the present form example. In the figure, a gamma characteristic before image quality conversion is represented by a broken line. In addition, the gamma characteristic of the emphasized display region after the image quality conversion is represented by a thick line, and the gamma characteristic of the non-emphasized display region is represented by a thin line.

(D-3) Effect

When a method of not only lowering the image quality of the non-emphasized display region part but also aggressively raising the image quality of the emphasized display region is adopted, a difference in outward appearance can be increased aggressively. Consequently, a display method that more excels in visibility can be realized. In addition, as described above, an improvement in image quality of the emphasized display region part can be absorbed by an effect of power saving of the non-emphasized display region part in many cases. Therefore an effect of power saving of the screen as a whole can also be achieved.

(E) Other Form Examples (a) The foregoing form examples assume a case where there is basically one emphasized display region. However, there may be a plurality of emphasized display regions. In this case, different image converting processes may be performed for the plurality of emphasized display regions, respectively. FIG. 18 shows an example of configuration of an organic EL display device 41 corresponding to this case.

FIG. 18, in which parts corresponding to those of FIG. 16 are identified by the same reference characters, represents a case where two kinds of converting operation units are prepared for emphasized display regions. That is, two emphasized region image quality converting units 511A and 511B are prepared.

(b) The foregoing form examples assume a case where there is basically one non-emphasized display region. However, there may be a plurality of non-emphasized display regions. In this case, different image converting processes may be performed for the plurality of non-emphasized display regions, respectively. FIG. 19 shows an example of configuration of an organic EL display device 51 corresponding to this case.

FIG. 19, in which parts corresponding to those of FIG. 16 are identified by the same reference characters, represents a case where two kinds of converting operation units are prepared for non-emphasized display regions. That is, two non-emphasized region image quality converting units 501A and 501B are prepared.

(c) In the foregoing form examples, description has been made of a case where an image quality converting unit subjects the entire screen to gradation conversion simultaneously, and the image quality selecting unit 503 disposed in a subsequent stage selectively outputs one thereof.

However, as in an organic EL display device 61 shown in FIG. 20, the by-region display image quality controlling unit 5 may be formed by a single image quality converting unit 513 and the image quality change controlling unit 505.

In the present example, the image quality converting unit 513 performs a different image quality converting process for each pixel on the basis of a change controlling signal supplied from the image quality change controlling unit 505.

(d) In the foregoing form examples, a case where thumbnail display of photographs is made in the form of a list is illustrated as an example of an emphasized display region specified so as to be interlocked with a display content of an application program.

Figure 21A:
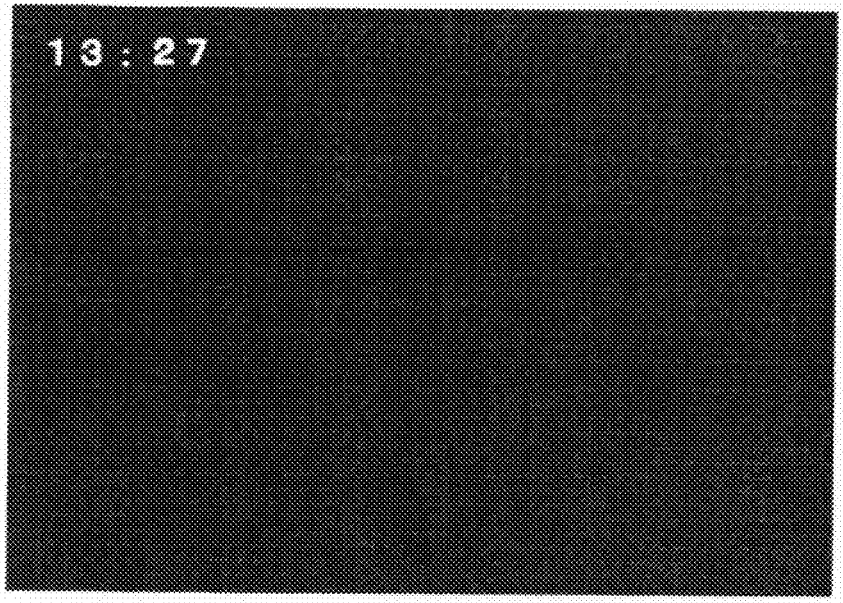
FIG. 21A is a diagram of explaining another example of specifying an emphasized display region.
Figure 21B:
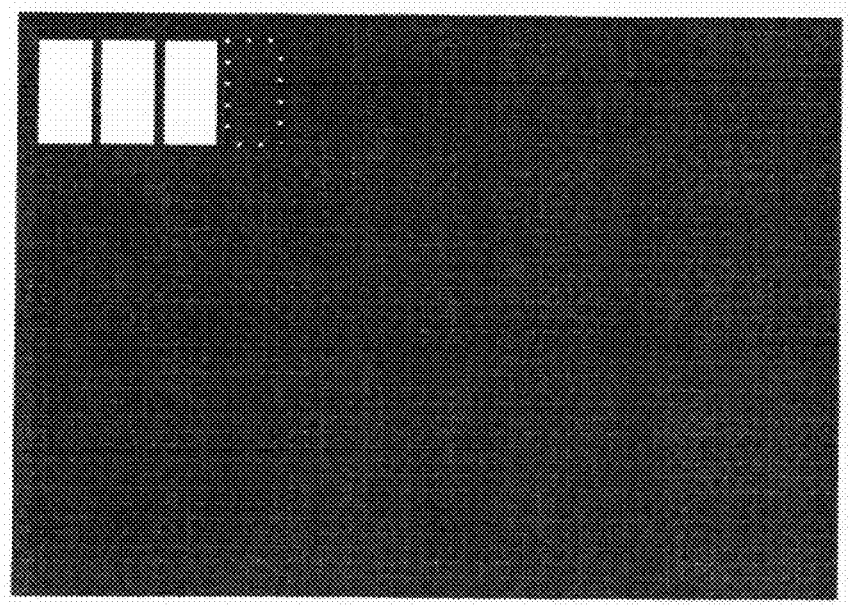
FIG. 21B is a diagram of explaining another example of specifying an emphasized display region.

However, an example of specifying the emphasized display region is not limited to this. For example, a button representing an object for operation, an icon, a title bar or the like may be specified. In addition, for example, a time display shown in FIG. 21A and a battery remaining amount display shown in FIG. 21B may be specified.

(e) In the foregoing form examples, description has been made of a case where fundamental primary colors are three colors of RGB. However, there can be applications to cases where the fundamental primary colors are four colors or more including a complementary color.

(f) In the foregoing form examples, description has not been made of a form of generating the fundamental primary colors. However, organic EL light emitting elements having different light emitting element materials for different fundamental primary colors may be provided, or the fundamental primary colors may be generated using a color filter system or a color conversion system.

(g) In the foregoing form examples, an organic EL display panel has been illustrated as an example of a self-luminous display device. However, there can be applications to other self-luminous display devices. For example, there can be applications to FEDs (field emission displays), inorganic EL display panels, LED panels, and others.

(h) In the foregoing form examples, description has been made of a case where a pixel array unit and a driving circuit (panel driver 7) are formed on one panel.

However, a pixel array unit and a driving circuit can also be manufactured and distributed separately from each other. For example, each driving circuit can also be manufactured as an independent drive IC (integrated circuit) and distributed independently of the organic EL panel.

Figure 22:
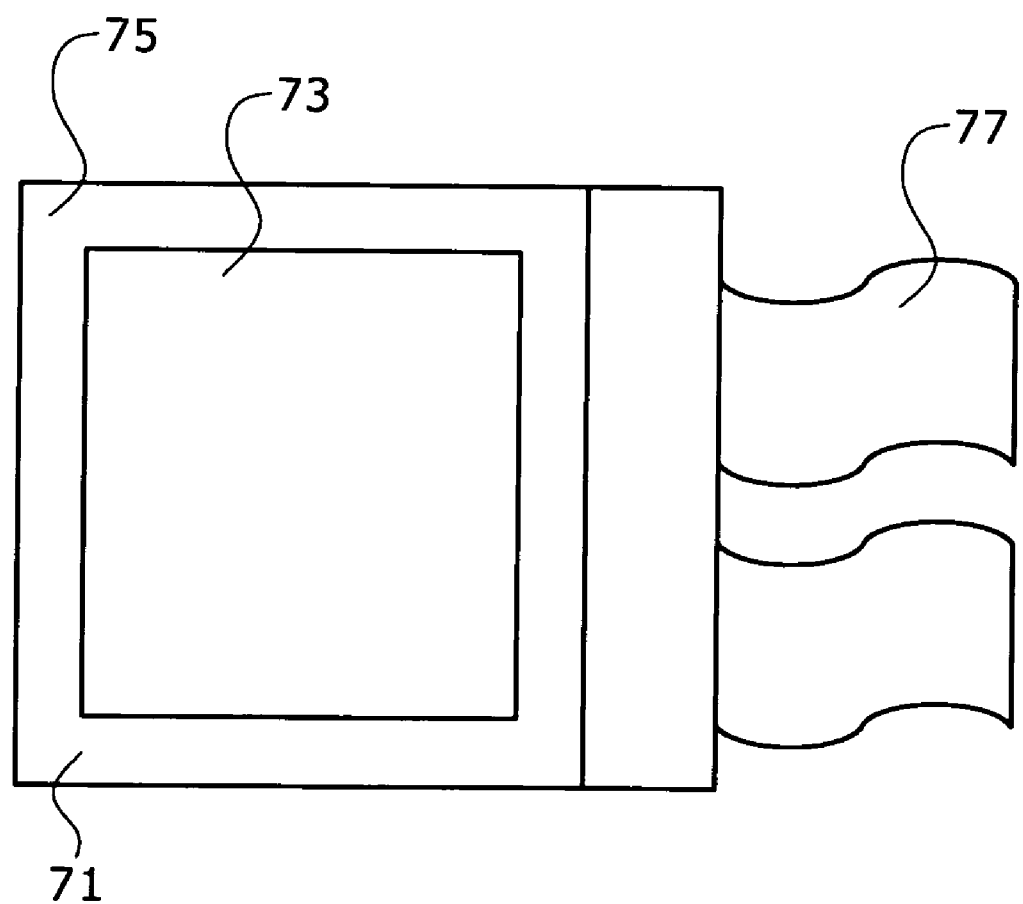
FIG. 22 is a diagram showing an example of configuration of a display module.

(i) The organic EL display devices according to the foregoing form examples can also be distributed in the form of a display module 71 having an external constitution shown in FIG. 22.

The display module 71 has a structure in which a counter part 73 is laminated to a surface of a supporting substrate 75. The counter part 73 has a transparent member such as glass or the like as a base material. The counter part 73 has a color filter, a protective film, a light shielding film and the like disposed on a surface thereof.

Incidentally, the display module 71 may be provided with a FPC (Flexible Printed Circuit) 77 or the like for externally inputting or outputting a signal and the like into the supporting substrate 75.

(j) The organic EL display devices according to the foregoing form examples can also be distributed in the form of a product implemented in an electronic device.

Figure 23:
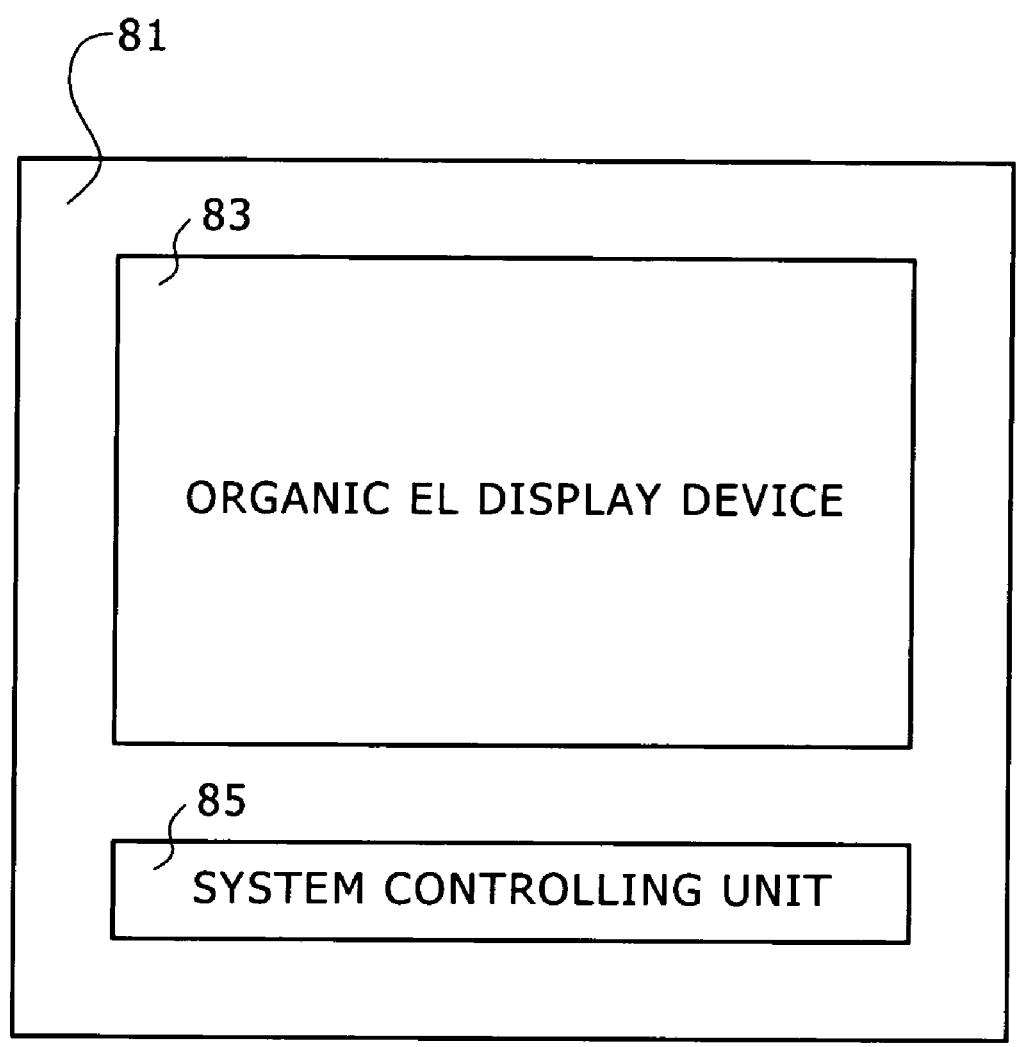
FIG. 23 is a diagram showing an example of functional configuration of an electronic device.

FIG. 23 shows an example of conceptual configuration of an electronic device 81. The electronic device 81 includes an organic EL display device 83 as described above and a system controlling unit 85. The content of processing performed by the system controlling unit 85 differs according to the product form of the electronic device 81.

Incidentally, the electronic device 81 is not limited to a device in a specific field as long as the electronic device 81 incorporates a function of displaying an image or video generated within the device or input externally.

Figure 24:
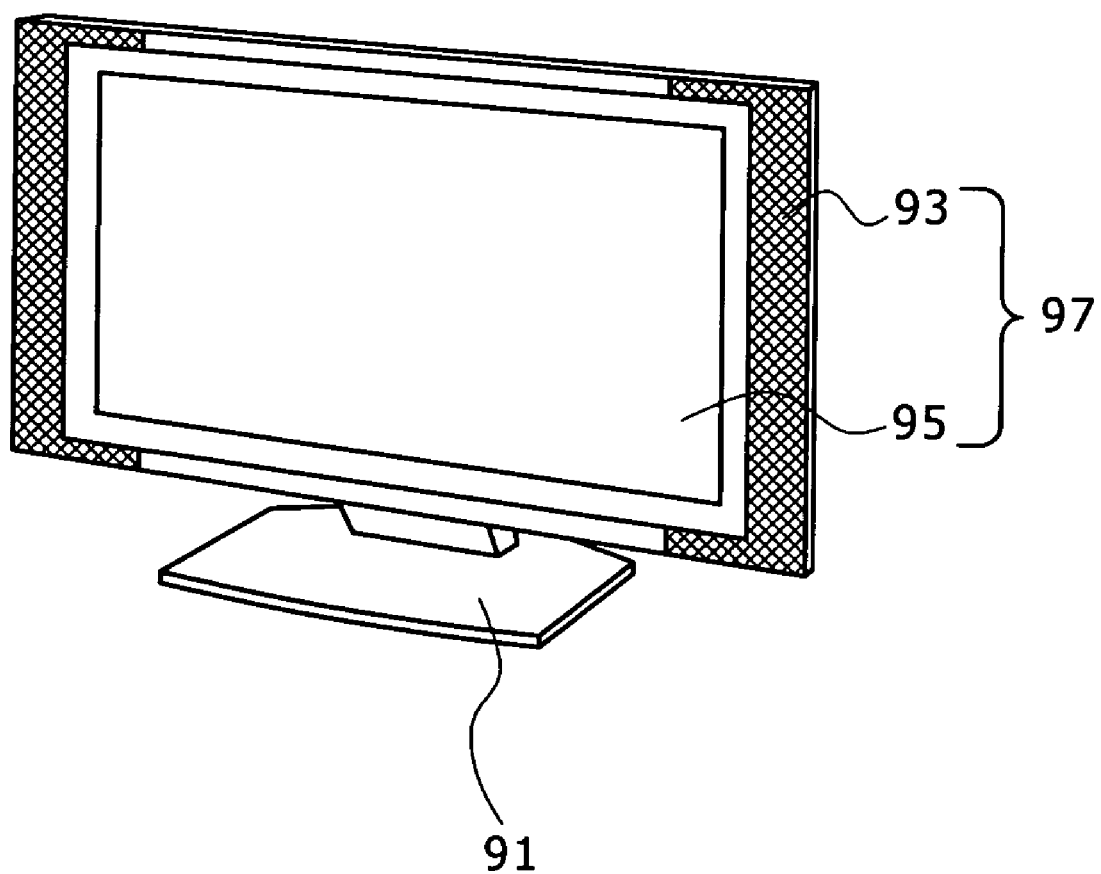
FIG. 24 is a diagram showing an example of a product of an electronic device.

A television receiver, for example, is assumed as this kind of electronic device 81. FIG. 24 shows an example of external appearance of a television receiver 91.

A display screen 97 formed by a front panel 93, a filter glass 95 and the like is disposed on a front side of a casing of the television receiver 91. The part of the display screen 97 corresponds to the organic EL display devices described in the form examples.

Figure 25A:
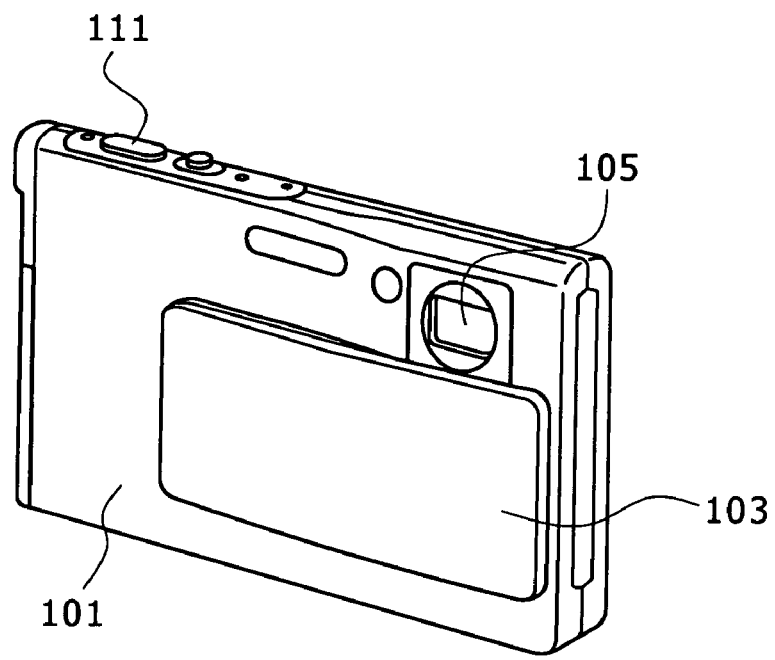
FIG. 25A is a diagram showing an example of a product of an electronic device.
Figure 25B:
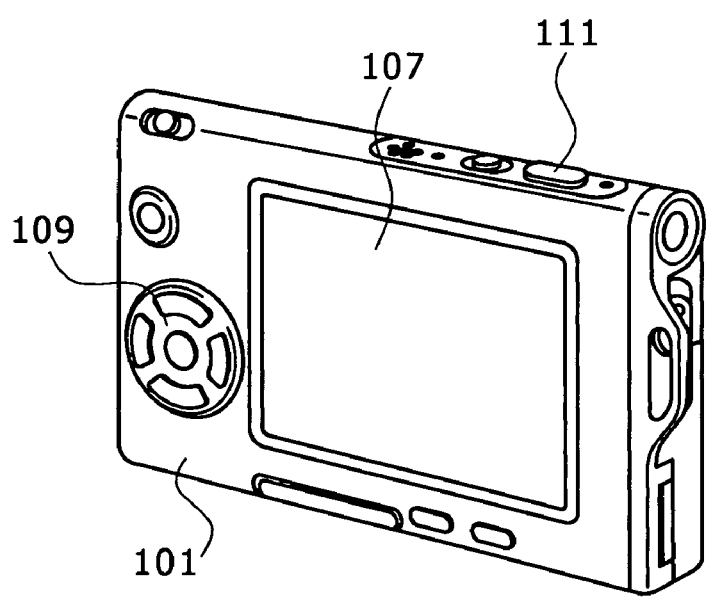
FIG. 25B is a diagram showing the example of the product of the electronic device.

In addition, a digital camera, for example, is assumed as this kind of electronic device 81. FIG. 25A and FIG. 25B show an example of external appearance of a digital camera 101. FIG. 25A is an example of external appearance on a front side (subject side), and FIG. 25B is an example of external appearance on a rear side (photographer side).

The digital camera 101 includes an image pickup lens (disposed on a back side of a protective cover 103, FIG. 25A and FIG. 25B being a state in which the protective cover 103 is closed), a light emitting unit 105 for flashlight, a display screen 107, a control switch 109, and a shutter button 111. Of these parts, the part of the display screen 107 corresponds to the organic EL display devices described in the form examples.

Figure 26:
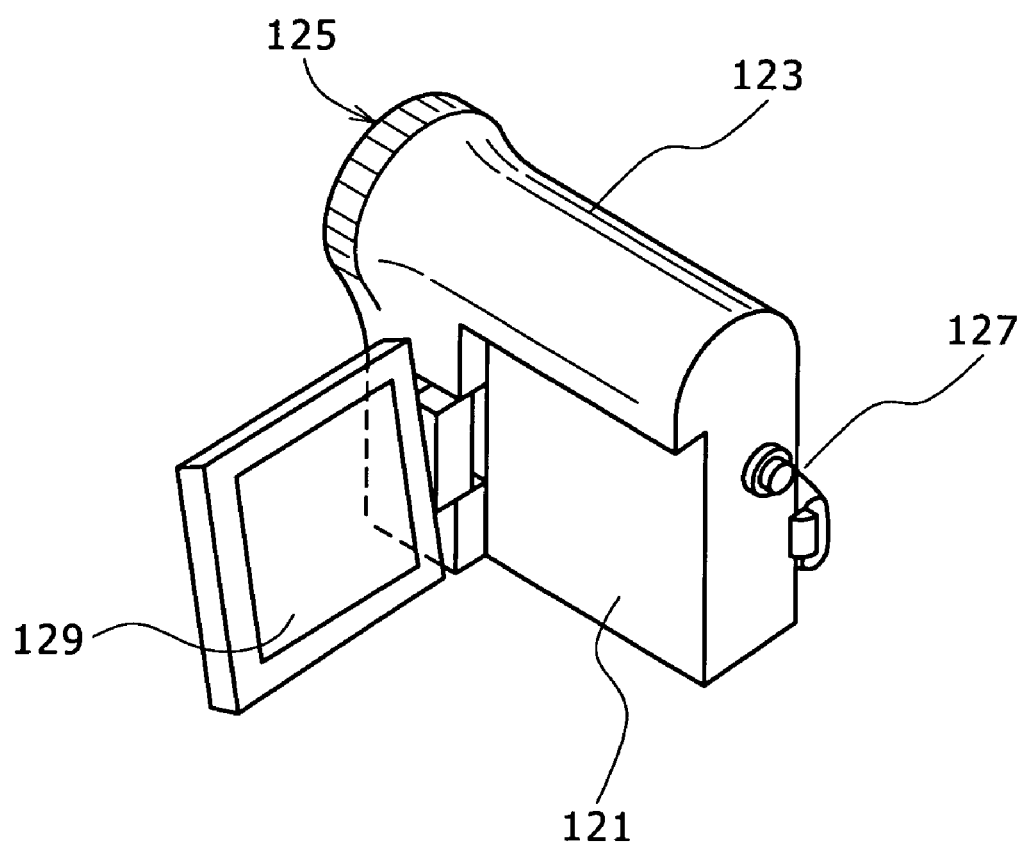
FIG. 26 is a diagram showing an example of a product of an electronic device.

In addition, a video camera, for example, is assumed as this kind of electronic device 81. FIG. 26 shows an example of external appearance of a video camera 121.

The video camera 121 includes an image pickup lens 125 for taking a picture of a subject in front of a main unit 123, a start/stop switch 127 for the picture taking, and a display screen 129. Of these parts, the part of the display screen 129 corresponds to the organic EL display devices described in the form examples.

Figure 27A:
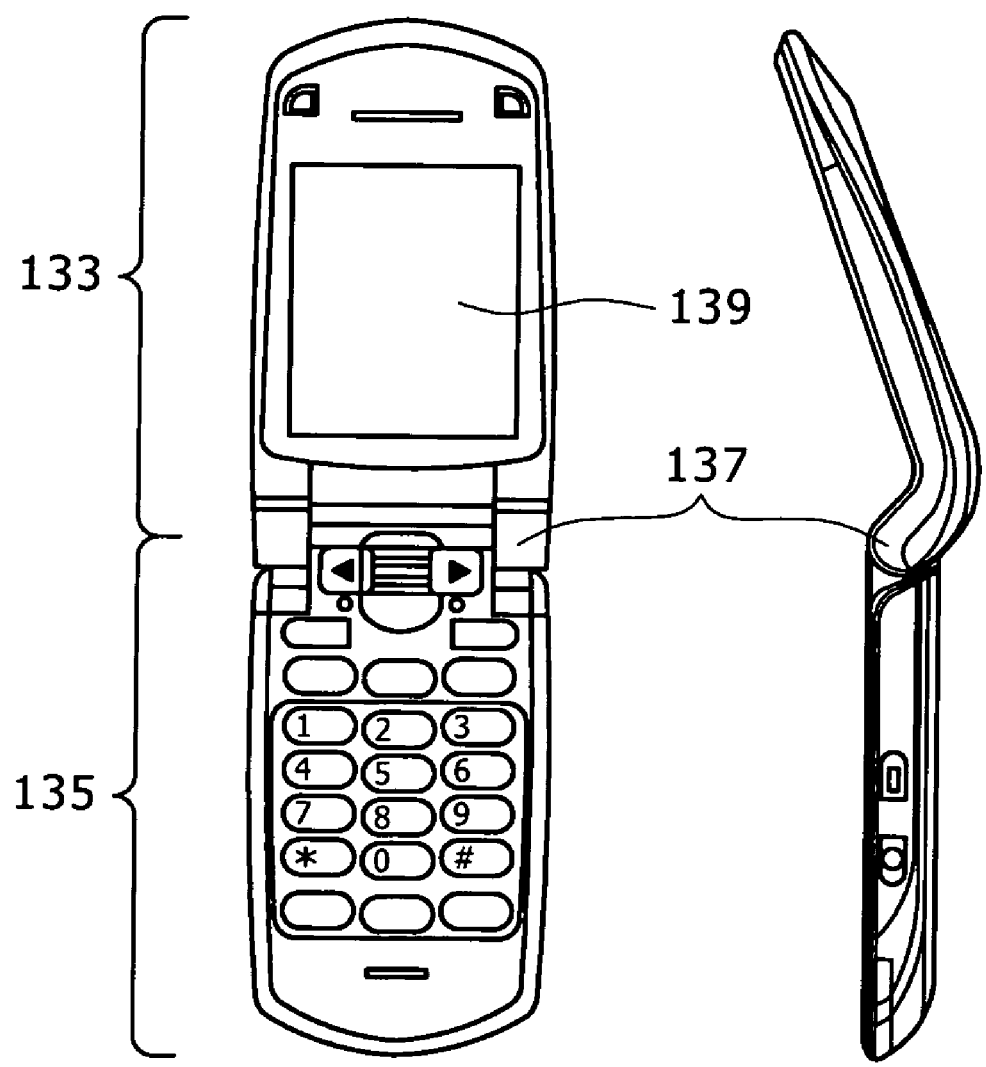
FIG. 27A is a diagram showing an example of a product of an electronic device.
Figure 27B:
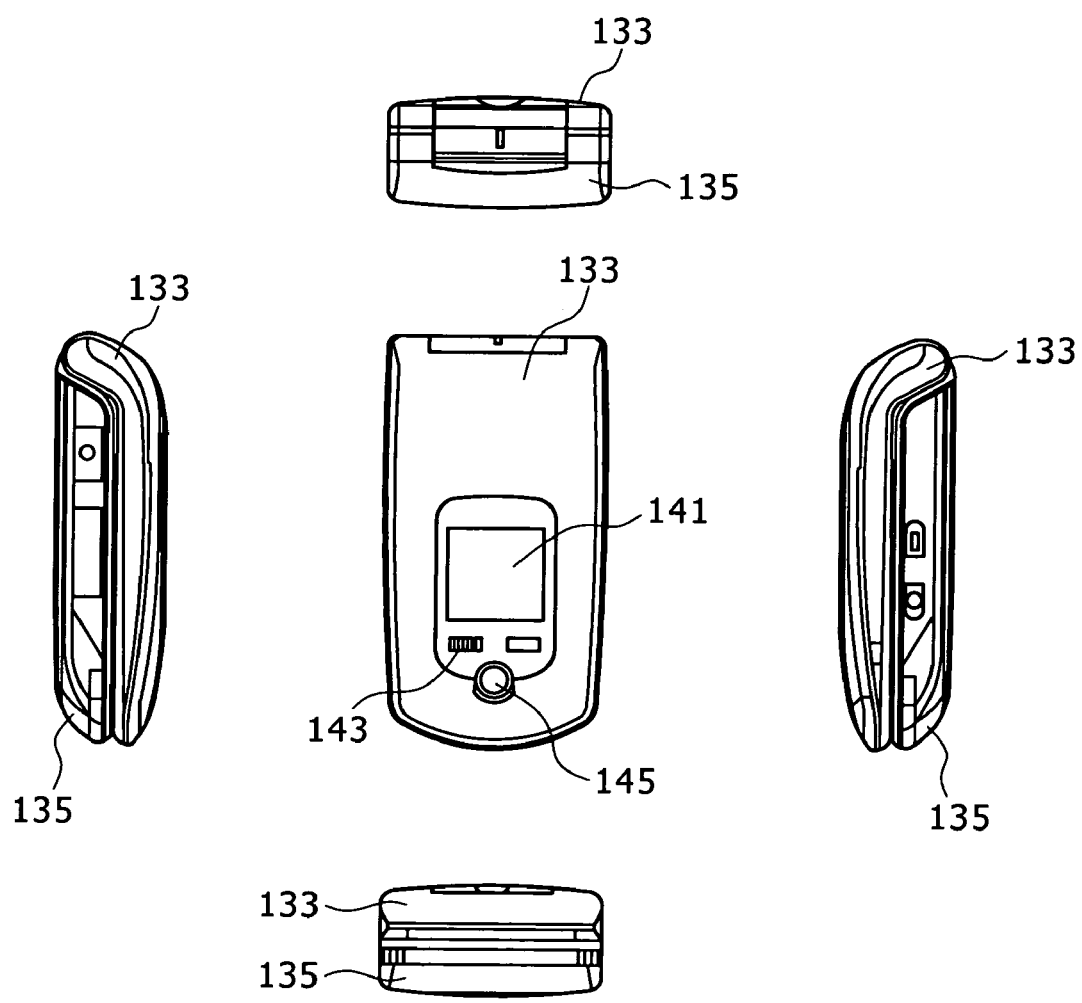
FIG. 27B is a diagram showing the example of the product of the electronic device.

In addition, a portable terminal device, for example, is assumed as this kind of electronic device 81. FIG. 27A and FIG. 27B show an example of external appearance of a portable telephone 131 as a portable terminal device. The portable telephone 131 shown in FIG. 27A and FIG. 27B is of a folding type. FIG. 27A is an example of external appearance in a state of a casing being opened. FIG. 27B is an example of external appearance in a state of the casing being folded.

The portable telephone 131 includes an upper side casing 133, a lower side casing 135, a coupling part (a hinge part in this example) 137, a display screen 139, an auxiliary display screen 141, a picture light 143, and an image pickup lens 145. Of these parts, the parts of the display screen 139 and the auxiliary display screen 141 correspond to the organic EL display devices described in the form examples.

Figure 28:
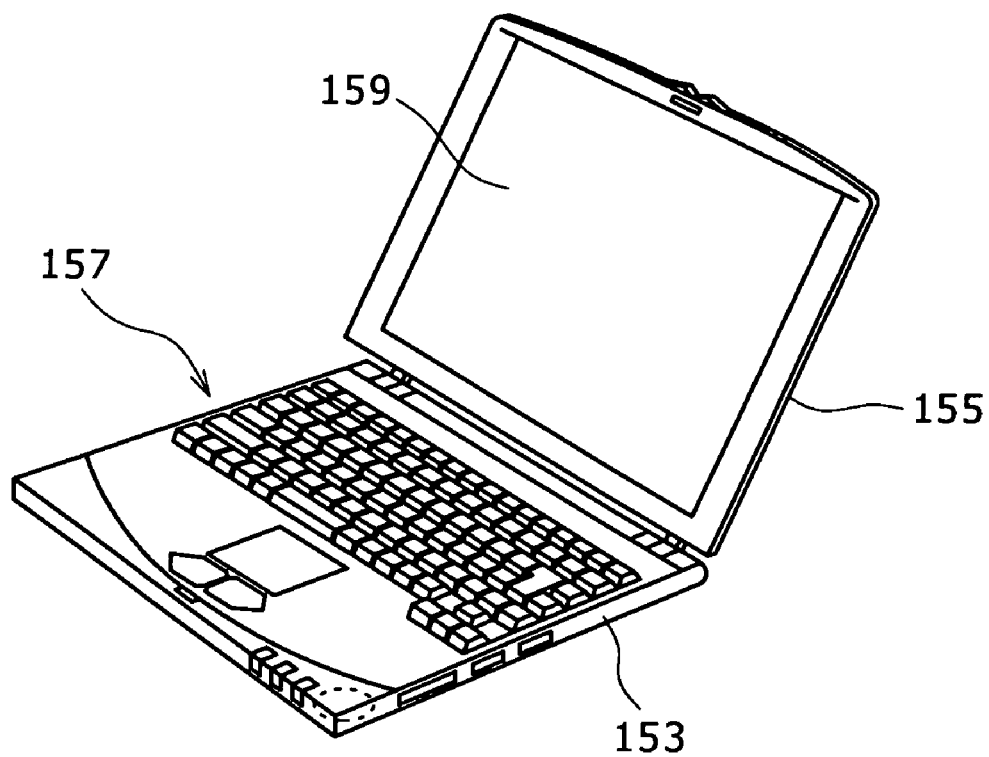
FIG. 28 is a diagram showing an example of a product of an electronic device.

In addition, a computer, for example, is assumed as this kind of electronic device 81. FIG. 28 shows an example of external appearance of a notebook computer 151.

The notebook computer 151 includes a lower type casing 153, an upper side casing 155, a keyboard 157, and a display screen 159. Of these parts, the part of the display screen 159 corresponds to the organic EL display devices described in the form examples.

In addition to these, an audio reproducing device, a game machine, an electronic book, an electronic dictionary and the like are assumed as the electronic device 81.

Incidentally, in a case of an electronic device incorporating a battery, driving time can be extended by incorporating a by-region display image quality controlling function.

In addition, in a case of an electronic device using a power outlet, an electricity charge can be saved by incorporating a by-region display image quality controlling function.

(k) In the foregoing form examples, description has been made of by-region display image quality controlling techniques from a functional aspect. However, equivalent functions can of course be realized as hardware and as software.

In addition, not only may all of these processing functions be realized by hardware or software, but also a part thereof may be realized using hardware or software. That is, a constitution as a combination of hardware and software may be formed.

(l) In the foregoing form examples, various examples of modification can be considered without departing from the spirit of the present invention. In addition, various examples of modification and examples of application created or combined on the basis of the description of the present specification can also be considered.

The invention claimed is:

1. A method for controlling display image quality of a display device, by a controller of the display device, in which self-luminous display elements are arranged in a form of a matrix by region, the method comprising:
receiving, by the controller, identification of an arbitrary position and an arbitrary size on a display screen as an emphasized display region to be interlocked with a display content of an application program,
determining, by the controller, another region part excluding said emphasized display region, and
reducing, by the controller, power consumed by said another region and lowering image quality for said another region as compared to said emphasized region,
wherein said reducing and said lowering occur simultaneously by changing a gamma characteristic that provides a correspondence between a gradation value and a luminance value,
wherein changing the gamma characteristic through the correspondence between the gradation value and the luminance value includes lowering the luminance levels associated with gradation values while retaining the characteristic of a gamma curve without changing a gamma value.

2. The method according to claim 1, wherein
an amount of decrease in power consumption in said other region part is allocated to an increase in power consumption in said emphasized display region in a range in which an effect of reduction in power consumption of an entire area of the display screen is not impaired.

3. A self-luminous display device characterized by comprising:
a display device in which self-luminous display elements are arranged in a form of a matrix; and
a by-region display image quality controlling unit for:
receiving identification of an arbitrary position and an arbitrary size on a display screen as an emphasized display region so as to be interlocked with a display content of an application program,
determining of another region part excluding said emphasized display region, and
reducing power consumed by said another region and lowering image quality for said another region as compared to said emphasized region, wherein said reducing and said lowering occur simultaneously by changing a gamma characteristic that provides a correspondence between a gradation value and a luminance value,
wherein changing the gamma characteristic through the correspondence between the gradation value and the luminance value includes lowering the luminance levels associated with gradation values while retaining the characteristic of a gamma curve without changing a gamma value.

4. The self-luminous display device according to claim 3, wherein
an amount of decrease in power consumption in said other region part is allocated to an increase in power consumption in said emphasized display region in a range in which an effect of reduction in power consumption of an entire area of the display screen is not impaired.

5. A computer program product stored on a non-transitory computer readable medium that when executed by a computer performs operations for controlling display image quality of a display device in which self-luminous display elements are arranged in a form of a matrix by region, comprising:
receiving identification of an arbitrary position and an arbitrary size on a display screen as an emphasized display region so as to be interlocked with a display content of an application program, and
determining another region part excluding said emphasized display region, and
reducing power consumed by said another region and lowering image quality for said another region as compared to said emphasized region, wherein said reducing and said lowering occur simultaneously by changing a gamma characteristic that provides a correspondence between a gradation value and a luminance value, wherein changing the gamma characteristic through the correspondence between the gradation value and the luminance value includes lowering the luminance levels associated with gradation values while retaining the characteristic of a gamma curve without changing a gamma value.

6. The computer program product according to claim 5, wherein an amount of decrease in power consumption in said other region part is allocated to an increase in power consumption in said emphasized display region in a range in which an effect of reduction in power consumption of an entire area of the display screen is not impaired.

* * * * *